(12) United States Patent
Raschke et al.

(10) Patent No.: US 9,672,616 B2
(45) Date of Patent: Jun. 6, 2017

(54) PROCESSING IMAGING DATA TO OBTAIN TISSUE TYPE INFORMATION

(71) Applicant: ST GEORGE'S HOSPITAL MEDICAL SCHOOL, London (GB)

(72) Inventors: Felix Raschke, Nottingham (GB); Franklyn Arron Howe, London (GB); Thomas Richard Barrick, London (GB)

(73) Assignee: St. George's Hospital Medical School, London (GB)

( * ) Notice: Subject to any disclaimer, the term of this patent is extended or adjusted under 35 U.S.C. 154(b) by 39 days.

(21) Appl. No.: 14/787,210

(22) PCT Filed: Apr. 25, 2014

(86) PCT No.: PCT/GB2014/051305
§ 371 (c)(1),
(2) Date: Oct. 26, 2015

(87) PCT Pub. No.: WO2014/174317
PCT Pub. Date: Oct. 30, 2014

(65) Prior Publication Data
US 2016/0086326 A1 Mar. 24, 2016

(30) Foreign Application Priority Data
Apr. 26, 2013 (GB) .................................. 1307590.8

(51) Int. Cl.
*G06K 9/00* (2006.01)
*G06T 7/00* (2017.01)
(Continued)

(52) U.S. Cl.
CPC .............. *G06T 7/0012* (2013.01); *G06T 7/11* (2017.01); *G06T 2207/10088* (2013.01);
(Continued)

(58) Field of Classification Search
CPC ................ G06T 7/00; A61B 5/00; G06K 9/00
(Continued)

(56) References Cited

U.S. PATENT DOCUMENTS 7,092,748 B2 * 8/2006 Valdes Sosa ............ A61B 5/04
600/407
9,050,022 B2 * 6/2015 Li ............................ A61B 8/08
(Continued)

FOREIGN PATENT DOCUMENTS

EP          1342225        9/2003
WO     2006/110768 A2    10/2006
(Continued)

OTHER PUBLICATIONS

Louis et al., The 2007 WHO Classifcation of Tumours of the Cental Nervous System. Acta Neuropathologica. 2007;114:97-109.
(Continued)

*Primary Examiner* — Abolfazl Tabatabai
(74) *Attorney, Agent, or Firm* — Reza Mollaaghababa; Thomas Engellenner; Pepper Hamilton LLP

(57) ABSTRACT

Methods and apparatus for obtaining probability density functions representing expected distributions of values of a parameter associated with an imaging modality are disclosed. The probability density functions are derived using data obtained from reference tissue volumes using the same imaging modality and at least one other type of imaging modality. The probability density functions are used to analyze data obtained from a volume of tissue of a patient in order to classify the tissue according to tissue type. Methods and apparatus are also disclosed in which deviations from a mean of an arctangent of ratios of first and second metabolite intensities in voxels are used to identify tissue types.

39 Claims, 24 Drawing Sheets

(51) Int. Cl.
G06T 7/11 (2017.01)
A61B 8/00 (2006.01)
A61B 5/00 (2006.01)

(52) U.S. Cl.
CPC .............. G06T 2207/20076 (2013.01); G06T 2207/20081 (2013.01); G06T 2207/30016 (2013.01); G06T 2207/30081 (2013.01); G06T 2207/30096 (2013.01)

(58) Field of Classification Search
USPC ....... 382/128, 129, 130, 131, 132, 133, 134; 600/313, 334, 442
See application file for complete search history.

(56) References Cited

U.S. PATENT DOCUMENTS

| | | |
|---|---|---|
| 2007/0036402 A1 | 2/2007 | Cahill et al. |
| 2009/0226060 A1 | 9/2009 | Gering et al. |
| 2013/0039558 A1 | 2/2013 | Balter et al. |

FOREIGN PATENT DOCUMENTS

| | | |
|---|---|---|
| WO | 2010/018478 A1 | 2/2010 |
| WO | 2010/122449 A1 | 10/2010 |
| WO | 2012/151579 A2 | 11/2012 |
| WO | 2013/088144 A1 | 6/2013 |

OTHER PUBLICATIONS

Tate et al., Development of a decision support system for diagnosis and grading of bain tumours using in vivo magnetic resonance single voxel spectra. NMR in Biomedicine. 2006;19(4):411-434.
Raschke et al., Classification of single voxel 1H spectra of brain tumours using LCModel, NMR in Biomedicine. 2012;25(2):322-331.
Opstad et al., Linear discriminant analysis of brain tumour 1H MR spectra: a comparison of classification using whole spectra versus metabolite quantification, NMR in Biomedicine, 2007;20(8):763-770.
Favre et al., An Analysis of the Respective Risks of Hernatorna Formation in 361 Consecutive Morphological and Functional Stereotactic Procedures. Neurosurgery. 2002;50(1):48-57.
Hall, The safety and efficacy of stereotactic biopsy for intracranial lesions. Cancer. 1998:82(9):1749-1755.
Jackson et al., Limitations of stereotactic biopsy in the initial management of gliomas. Neuro-oncology. Jul. 2001;3 (3):193-200.
Price et al., improved Delineation of Glioma Margins arid Regions of Inflltration with the Use of Diffusion Tensor Imaging: An Image-Guided Biopsy Study. AJNR Am J Neuroradiol. 2006;27(9):1969-1974.
McKnight et al., Histopathological validation of a three-dimensional magnetic resonance spectoscopy index as a predictor of tumor presence. Journal of Neurosurgery. Oct. 2002;97(4):794-802.
Pirzkall et al., 3D MRSI for resected high-grade gliomas before RT: tumor extent according to metabolic activity in relation to MRI. International Journal of Radiation Oncology*Biology*Physics, 2004;59(1):126-137.
Lee et al., Patterns of failure following high-dose 3-D conformal radiotherapy for high-orade astrocytomas: a quantitative dosimetric study. International Journal of Radiation Oncology*Biology*Physics, 1999;43(1):79-88.
Oppitz et al., 3D-recurrencepatterns of gliobastomas after CT-planned postoperative irradiation. Radiotherapy and Oncology. 1999;53(1):53-57.
Price et al., Predicting patterns of glioma recurrence using diffusion tensor imaging. European Radiology. Jul. 2007;17(7):1675-1684.
Prastawa et al., A brain tumor segmentation framework based on outlier detection, Medical Image Analysis. 2004;8(3):275-283.
Luts et al., Nosologic imaging of the brain: segmentation and classification using MRI and MRSI. NMR in Biomedicine. 2009;22(4):374-390.
De Edelenyi et al., A new approach for analyzing proton magnetic resonance spectroscopic images of brain tumors: nosologic images. Nat Med. Nov. 2000;6(11):1287-1289.
Postma et al., On the relevance of automatically selected singe-voxel MRS and multimodal MRI and MRSI features for brain tumour differentiation, Computers in Bioloay and Medicine. 2011;41(2):87-97.
Wright et al., Pattern recognition of MRSI data shows regions of glioma growth that agree with DTI markers of brain tumor infiltration, Magnetic Resonance in Medicine. 2009;62(6):1646-1651.
Simonetti et al., Combination of feature-reduced MR spectroscopic and MR imaging data for improved brain tumor classification. NMR in Biomedicine. 2005;18(1):34-43.
Devos et al., The use of multivariate MR imaging intensities versus metabolic data from MR spectroscopic imaging for brain tumour classification. Journal of Magnetic Resonance. 2005:173(2):218-228.
Galanaud et al., Noninvasive diagnostic assessment of brain tumors using combined in in vivo MR imaging and spectroscopy. Magn Reson Med. 2006;55(6):1236-1245.
Pena et al., Enhanced visualization and quantification of magnetic resonance diffusion tensor imaging using the p:q tensor decomposition. British Journal of Radiology. 2006;79(938):101-109.
Sibtain et al., The clinical value of proton magnetic resonance spectroscopy in adult brain tumours. Clinical Radiology, 2007;62(2):109-119.
Provencher, Estimation of metabolite concentrations from localized in vivo proton NMR spectra. Magnetic Resonance in Medicine. 1993;30(6):672-679.
Provencher, Automatic quantitation of localized in vivo 1H spectra with LCModel. NMR in Biomedicine. 2001;14 (4):260-264.
Wlson et al., A constrained least-squares approach to the automated quantification of in vivo 1H magnetic resonance spectroscopy data. Magnetic Resonance in Medicine. 2011;65(1):1-12.
Raschke et al., Classification of single-voxel 1H spectra of childhood cerebellar tumors using lcmodel and whole tissue representations. Magnetic Resonance in Medicine. 2013;70:1-6.
McKnight et al., An automated technique for the quantitative assessment of 3D-MRSI data from patients wth glioma. J Magn Reson Imaging. 2001;13(2):167-177.
Raschke et al., Analysis of 1H MRSI data of brain tumours usina LCModel and whole tissue representations. Proc. Intl. Soc. Mag. Reson. Med, 20;2012:836.
Juan-Albarracin et al., Automated Glioblastorna Segmentation Based on a Multiparametric Structured Unsupervised Classification. PLOS ONE, 2015:1-20.
Raschke et al., 1H 2D MRSI Tssue Type Anayss of Gliomas. Magnetic Resonance in Medicine, 2014:1-9.
Sauwen et al., Hierarchical non-negative matrix factorization to characterize brain tumor heterogeneity using multi-parametric MRI, NMR Biomed, 2015:1-26.
Yang et al., Manifold Learning in MR Spectroscopy Using Nonlinear Dimensionality Reduction and Unsupervised Clustering. Magnetic Resonance in Medicine 2014:1-11.
Zikic et al., Decision Forests for Tissue-specific Segmentation of High-grade Gliomas in Multi-channel MR, 2014:1-8.

* cited by examiner

Fig.7
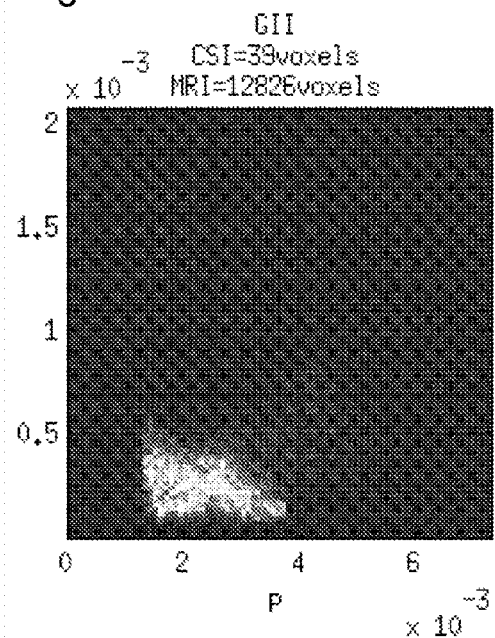
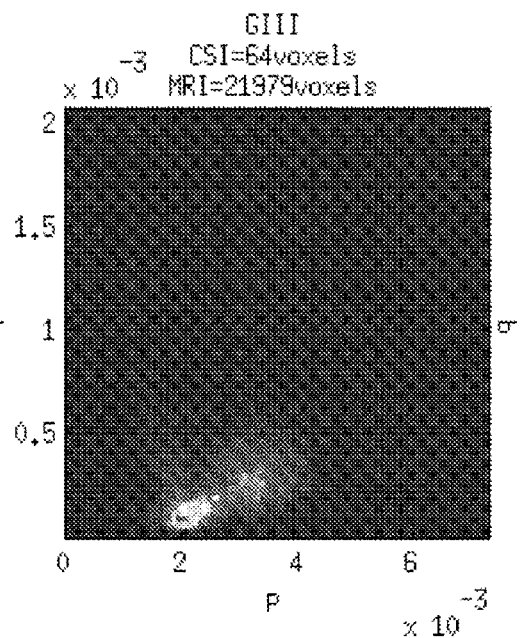
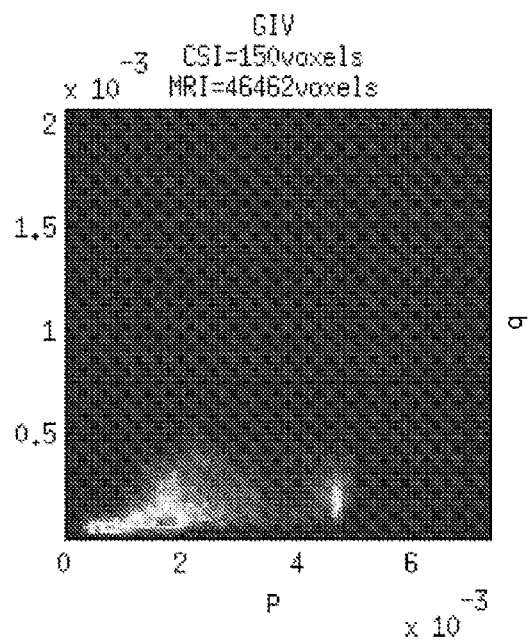

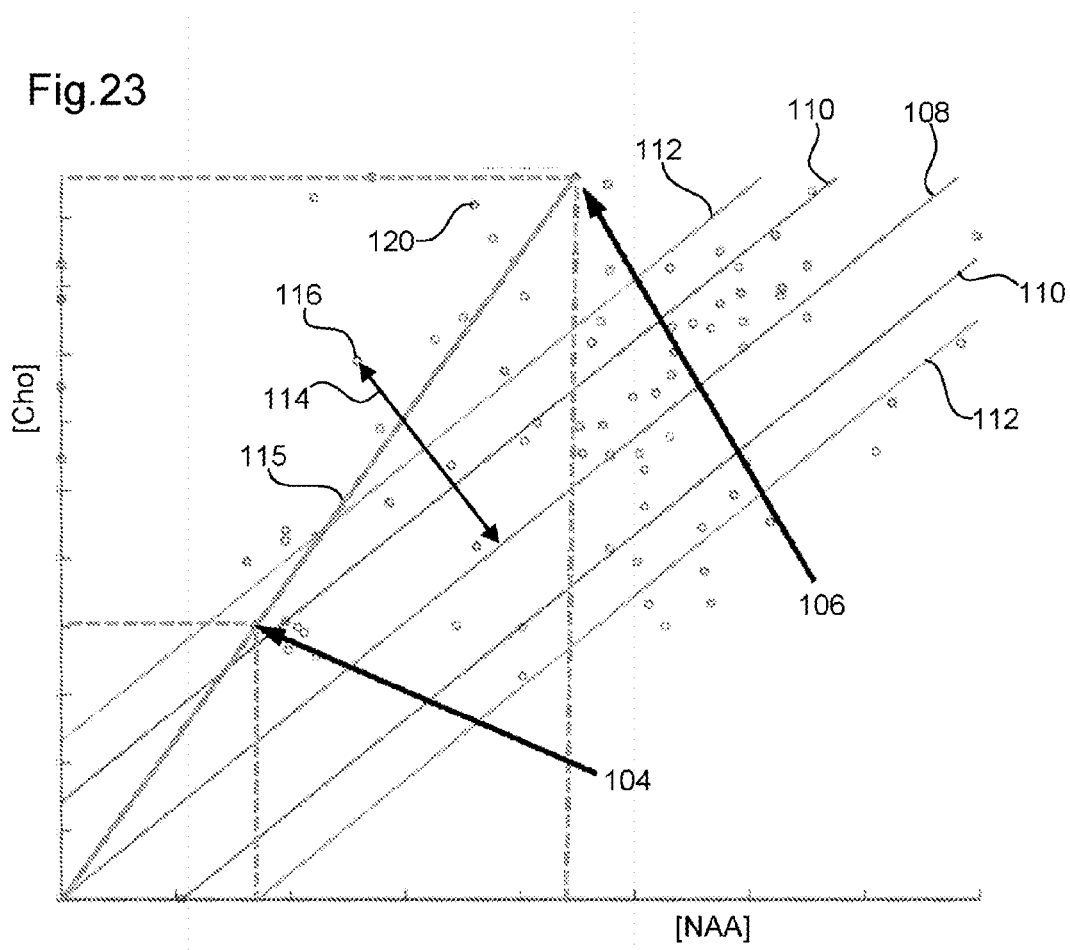

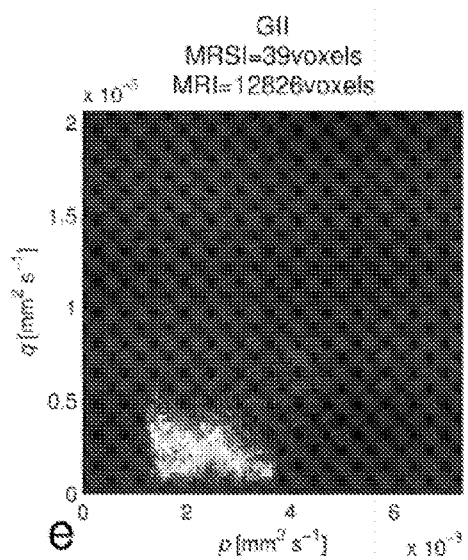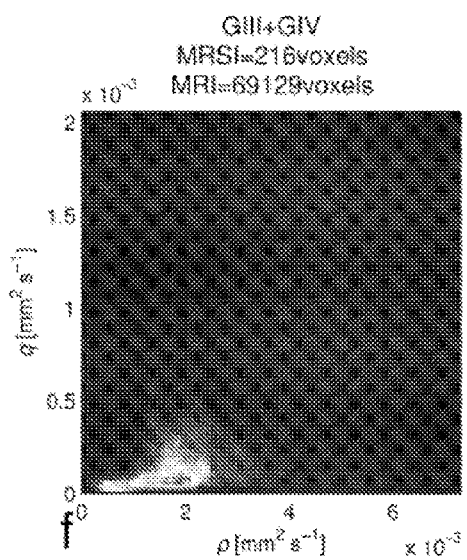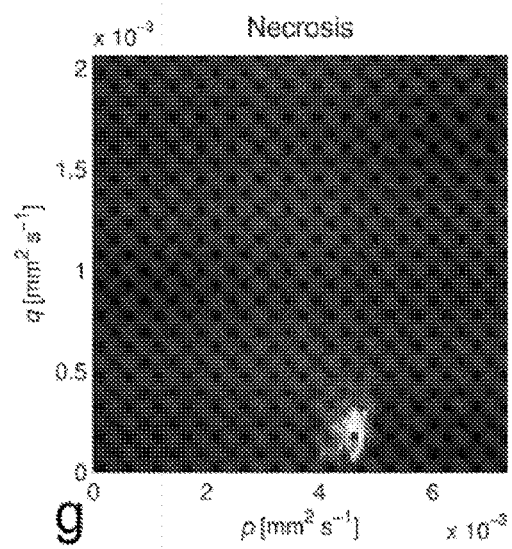

PROCESSING IMAGING DATA TO OBTAIN TISSUE TYPE INFORMATION

The present invention relates to a data processing method for obtaining tissue type information from imaging data. The invention is particularly applicable to processing MRI data. The invention is particularly useful for the diagnosis and management of tumours, for example in the brain.

There are about 4800 brain tumour cases diagnosed annually in the UK. In children, brain tumours are the second most common cancer after leukemia with an average 5-year survival rate of 71%. There are more than 120 different brain tumour types which are divided into grade I, grade II (GII), grade III (GIII) and grade IV (GIV) tumours [1]. With increasing grade, the aggressiveness of the tumour increases and patient survival decreases. Magnetic resonance imaging (MRI) is the most important tool for diagnosis and managing of brain tumours. There are many different MR modalities available. FIG. 3 shows example images of a GIV glioblastoma brain tumour patient. T2-weighted (T2w) and FLAIR (Fluid attenuated inversion recovery) imaging sequences shows fluid components as hyper-intense, T1-weighted (T1w) imaging shows solid components hyper-intense, proton density imaging (PD) shows the total signal intensities corresponding to all water (brain tissue) and fat (skull, necrosis), diffusion tensor imaging (DTI) derived modalities p (isotropic water diffusion) and q (anisotropic water diffusion) give tissue microstructural information and MR Spectroscopy (MRS) shows metabolic information with a much larger voxel size. Classification of brain tumours is very important as treatment strategies vary greatly for different tumour types. For example, GII gliomas are usually not treated immediately and instead kept under watch and wait policy, whereas GIV gliomas will be undergoing surgery and/or radiotherapy immediately.

There are many research studies that use single MR modalities or a combination of MR modalities to classify between different brain tumour types. Although differentiation between GII and GIV tumours is relatively accurate by application of MRS, differentiation between GII and GIII is more challenging [2, 4]. Consequently the gold standard for classifying brain tumours is a biopsy and histopathological analysis. Histopathological grading is done according to the most malignant properties found in the tissue sample. However biopsy has several limitations:

1. It is not without risk, morbidity and mortality rate ~2.4% and 0.8% respectively. [5, 6]
2. As gliomas show very heterogeneous growth, a single point biopsy might not pick up the highest tumour grade present.
3. Reported diagnostic yield varies between 96% [6] and 53% [7]
4. Biopsy does not provide information regarding the tumour extent.

Due to the infiltrative characteristics of gliomas it is hard to determine exact tumour boundaries. However, spatial information about the tumour core and its surrounding infiltrating regions is absolutely crucial for precise surgery and radiotherapy planning. Surgery is usually planned on post contrast T1w imaging which highlight the solid tumour components as hyperintensities. To make best use of this information, the surgeons may utilise a system that combines use of 3D MRI data with data from two cameras to align the 3D MRI image with the patients head in the operating room. The surgeons can then pinpoint any anatomical location in the patients head on the MRI to identify where the tumour is located. However, such systems are limited by the accuracy of the MRI information provided. While MR imaging usually shows clear anatomical abnormalities indicative of a brain tumour and its boundary, it has been shown that infiltrating tumour can be found beyond the boundaries observed on T1w and T2w imaging. Studies (e.g. [8]) have shown that DTI can identify abnormalities in regions that are normal appearing in T1w and T2w images. However, it is important to note that a biopsy sample can only confirm a few single points in the p,q distribution. Similar studies have shown tumour tissue beyond boundaries seen on standard imaging using metabolic information provided by MRS [9, 10]. However, MRS has a very low spatial resolution compared to MRI. As a result, the use of MRS as a delineation tool for brain tumours requires heavy image interpolation, reduces the accuracy of the identified boundaries.

The finding of tumour tissue beyond standard MRI boundaries changed radiotherapy planning. In particular, radiotherapy can either be used as a primary treatment to destroy the tumour tissue or an additional treatment after surgery to destroy residual tumour cells. Planning of the radiation volume is still done according to standard imaging, typically T1w imaging, but to account for tumour infiltration a 1-4 cm margin is added which will irradiated at a lower dose [11]. As shown in the example of a glioblastoma in FIG. 3, drawing a region encompassing a margin around the tumour in the T1w image is highly subjective (as for any hand drawn regions of interest) and dependent on the expertise of the radiologist. This is especially the case if it is a non-enhancing lesion.

The success of treatment of either radiotherapy or surgery can be measured by observation of the patient over time. It is found that in almost all GIV glioblastoma patients there is tumour recurrence within the high dose radiation volume [11, 12]. This suggests a need for a higher dose to the central part of the tumour. However, increases to the maximum radiation dose require the tumour to be more accurately localized and involves defining the viable tumour core (for a very high dose) and the surrounding heterogeneous infiltrating tumour patterns (for a lower radiation dose to reduce damage to functional tissue). As discussed above, DTI and MRS hold the potential to provide this information. However, previously published diffusion methods [13] rely on hand drawn regions of interests (ROI) around the lesion and have not been able to discriminate between different tumour grades or identifying regions of tumour infiltration. It is important to realize that a heterogeneous GIV tumour could include a small high density tumour core surrounded by an infiltrative region. MRS is able to make this discrimination between tumour grades, but precise localization is not possible due to its very low resolution.

There have been attempts in applying atlas based segmentation methods to standard imaging techniques in order to automatically segment MRIs into normal and tumour tissue. In [14] a case by case analysis method is presented. Firstly a T2w image is co-registered to a standard brain atlas and the image pixels that have image intensities above those for normal brain are considered abnormal. Additional MRI modalities could be added to such a technique to improve segmentation quality. Prastawa et al. then performed a further division of those abnormal regions into tumour and oedema using cluster analysis, as oedema and tumour are expected to have different image intensities. This approach does however rely on prior information in the form of a standard brain atlas and statistical assumptions such as normally distributed data. Furthermore, grading of the tumour was not possible.

The results of previous studies using DTI and MRS imply that a combination of MRS, DTI and possibly standard MRI could help in tumour grading and accurate spatial localization. The main difficulty for combining these data types is the large differences in acquired spatial resolution. While diffusion imaging and standard MRI have a voxel volume in the order of 1-10 mm$^3$, MRS voxels are a factor of 1000 larger at around 4000-8000 mm$^3$. Providing a robust and accurate method for combining these data types is therefore crucial to maximizing the usefulness of the available information.

There are many publications combining MRI/DTI and MRS data in order to improve delineation and classification of brain tumours. However, all of them either (i) interpolate the MRS data to match the MRI data [15, 16] or (ii) reduce the MRI resolution to match that of the MRSI data [17, 18, 19, 20]. Interpolating the MRS data to match the MRI resolution will not provide any additional information and more importantly not increase the spatial resolution of the images. Instead a strong bias of the metabolic distribution across the brain will be made towards the interpolation method and smaller localized changes cannot be detected. The second approach lowers the MRI resolution and therefore removes any advantages for acquiring high resolution multimodal MRI. While it has been shown to slightly increase the accuracy in discriminating between some tumour types [21, 19], this method is not suitable for tumour delineation due to the low resolution.

The above challenges apply also to combining data from other imaging modalities (e.g. from MR, CT and/or PET) having different spatial resolutions, and/or to the problem of diagnosing and/or managing other pathologies, including for example stroke and dementia.

It is an object of the present invention to provide an improved way of combining imaging data obtained using different imaging modalities that does not require interpolation or make statistical assumptions about the data.

According to an aspect, there is provided a computer-implemented method of obtaining one or more probability density functions, each representing, for a different one tissue type from a plurality of possible tissue types of a predetermined classification scheme, a variation in a probability of obtaining a value of a first parameter associated with a first imaging modality over a range of possible values, the probability density function being for use in processing first imaging data obtained using the first imaging modality from a volume of tissue of a patient in order to assign each of first imaging voxels of the first imaging data to one of the tissue types of the classification scheme, the method comprising: accessing a reference database comprising second imaging data obtained from at least one reference tissue volume using a second imaging modality, the second imaging data comprising a value of a second parameter associated with the second imaging modality for each of a plurality of second imaging data voxels, and third imaging data obtained from the same at least one reference tissue volume using the first imaging modality, the third imaging data comprising a value of the first parameter for each of a plurality of third imaging data voxels; using the second imaging data to identify the tissue type, according to the predetermined classification scheme, of a plurality of the second imaging data voxels in the reference tissue volume; for each tissue type, identifying which third imaging data voxels correspond to second imaging data voxels of the tissue type in order to identify a set of third imaging data voxels corresponding to each tissue type; and analysing the distribution of values of the first parameter for the set of third imaging data voxels of each tissue type in order to determine the probability density function for the first parameter value for each of the tissue types.

According to an aspect, there is provided a method of processing first imaging data obtained from a volume of tissue of a patient using the obtained probability density functions, including comparing the value of the first parameter in each of the first modality voxels of the first imaging data from the patient to the probability density functions and assigning each of the first modality voxels to a tissue type class on the basis of the comparison. In an embodiment, the method also comprises performing the steps of obtaining the probability density functions.

Thus, a method is provided that allows reference information obtained using an imaging modality (the "second imaging modality") that is different to that used for obtaining data from the patient (the "first imaging modality") to be combined more effectively (than prior art approaches) with the data obtained from the patient. In an embodiment, the second imaging modality may be more effective than the first imaging modality at determining a tissue property in each of its voxels. The second imaging data may optionally be combined with other reference data, for example data obtained by biopsy and histopathological analysis. A plurality of different second imaging modalities may be used.

In an embodiment, the second imaging modality has a lower resolution than the first imaging modality. In this case, the method may desirably enable tissue type classification to be performed at a resolution that is higher than would be possible based only on the second imaging modality. In other embodiments, the second imaging modality has the same or a higher resolution than the first imaging modality. In an embodiment, the second imaging modality may be an imaging modality that is expensive or of limited availability (e.g. PET). Such an embodiment may therefore desirably enable the benefits of such a second imaging modality to be applied to a patient to which the second imaging modality has not been applied.

In the case where the second imaging modality is an MRS modality and the first imaging modality is an MRI modality (e.g. T1-w, T2-w, FLAIR, PD, DTI-p, DTI-q), the second imaging modality may be able to determine particularly effectively whether each of its voxels belongs to brain tissue, pure GII tumour, pure GIII tumour, or pure GIV, particularly when combined with other reference data, from biopsy and histopathological analysis for example.

The second imaging modality may also be able to determine which voxels comprise a predetermined mixture of any of these tissue types. The identification of such mixtures may be useful for identifying regions of infiltration of tumour into normal tissue. Mapping this (optionally low resolution) information effectively onto (an optionally higher resolution) set of voxels associated with an imaging modality that is being used on the patient may be highly beneficial for the diagnosis, management and treatment (e.g. by surgery or radiotherapy) of the disease.

According to an embodiment, the second imaging modality is an imaging modality that is not able to image as large a proportion of the volume of interest as the first imaging modality. This is the case for example where the volume of interest is the human brain, the first imaging modality is an MRI modality and the second imaging modality is MRS. MRS can typically only obtain information from a relatively central part of the brain and is not able to access peripheral regions to the same extent as MRI. For prior art approaches using interpolation or resolution reduction this greatly restricts the extent to which the MRS data can be used to deduce the tissue of MRI voxels in the peripheral regions. According to embodiments disclosed herein the same restriction does not apply. The probability density functions can be obtained based on MRS information from anywhere within the brain (e.g. from the central regions where MRS data is routinely easily extractable) and can be applied anywhere in the brain (e.g. in peripheral regions where MRS data cannot be extracted, as well as in other regions).

In contrast to prior art approaches using atlas based segmentation, the present method does not need to approximate the probability density function by e.g. Gaussian distributions, thus does not impose prior assumptions about data distribution.

In an embodiment, the second imaging modality comprises perfusion imaging, which is also effective for identifying tissue type of tumours. In other embodiments, the second imaging modality comprises other imaging techniques or combinations of techniques.

The method can be applied particularly effectively to evaluate brain tumours according to their grade and spatial extent at high resolution in the human brain. The method can also be applied effectively to other parts of the body, for example to evaluate prostate cancer and/or to other types of disease.

A further advantage is that once adequate second imaging data (and, optionally, corresponding other reference data, for example data obtained by biopsy and histopathological analysis) is built up in the reference database no further data using the second imaging modality need be obtained. Thus, the method can be used to extract high resolution tissue type data about a patient who has been subjected to the first imaging modality but not necessarily the second (or biopsy). This may be particularly useful where the second imaging modality is not easily available and/or is very expensive or time consuming to perform.

In an embodiment, the probability density functions are multidimensional so that information obtained using a plurality of first imaging modalities, which may have the same resolution as each other or different resolutions, can be used to obtain even more accurate information about tissue type classification. For example, information about a voxel obtained using one or more of the following modalities can be used to index a multidimensional probability density function in order to derive a more accurate predication of tissue type: T1-weighted, T2-weighted, Fluid attenuated inversion recovery, proton density imaging, diffusion tensor imaging modality p, diffusion tensor imaging modality q, diffusion tensor imaging modality MD, diffusion tensor imaging modality FA. The inventors have found that a particularly effective combination of modalities is diffusion tensor imaging-p, diffusion tensor imaging-q, T2-weighted MRI, and proton density imaging.

In an embodiment, the method is wholly or partially performed by a computer. The computer may comprise standard well known hardware that enables the necessary computational operations to be carried out, e.g. CPU, RAM, motherboard, memory devices, etc. The reference database may be stored locally at the computer or at a remote server connected to the computer via a network such as the internet for example.

According to an alternative aspect of the invention, there is provided an imaging apparatus, comprising: an imaging device configured to use a first imaging modality to obtain first imaging data from a volume of tissue of a patient, the first imaging data comprising a value of a first parameter associated with the first imaging modality for each of a plurality of first imaging data voxels; a storage device storing one or more probability density functions, each representing, for one tissue type from a plurality of possible tissue types of a predetermined classification scheme, a variation in a probability of obtaining a value of the first parameter over a range of possible values; and a data processing device configured to compare the value of the first parameter in each of the first imaging data voxels of the first imaging data from the patient to the stored probability density functions in order to assign each of the first imaging data voxels to one of the tissue type classes, wherein the probability density functions are obtained according to embodiments of the invention. In an embodiment, the imaging apparatus is configured to perform the method steps necessary to obtain the probability density functions.

According to an alternative aspect of the invention, there is provided a computer-implemented method of processing data in order to identify the tissue type of voxels in a volume of tissue, wherein: the data comprises for each voxel a first value indicative of an amount of a first metabolite in the voxel and a second value indicative of an amount of a second metabolite in the voxel, the method comprising obtaining the mean of the arctangent of the ratio of the first and second values over all voxels; identifying voxels lying within a standard deviation of the arctangent of the ratio of the first and second values multiplied by a predetermined factor from the mean as voxels belonging to a first tissue type and voxels lying outside of a standard deviation of the arctangent of the ratio of the first and second values multiplied by a predetermined factor from the mean as voxels belonging to a second tissue type.

This method provides a more reliable way of interpreting imaging data (e.g. MRS data), reducing in particular the overestimation of abnormal tissue at low metabolite levels that can occur with other techniques, such as the so-called CNI method [28]. The method is particularly applicable to the case where the first and second metabolites are Choline and NAA but is not limited to this. The method is applicable to other combinations of metabolites, particularly where the ratio of the amounts of the metabolites is indicative of a tissue type.

In an embodiment, the amounts of metabolites are scaled so that the mean of the amount of the first metabolite is equal (or approximately equal) to the mean of the amount of the second metabolite over the range of voxels considered. This makes the method robust against differences in first and second metabolite amounts by providing a symmetric distribution of values about the arctangent.

Embodiments of the invention will now be described, by way of example only, with reference to the accompanying drawings in which corresponding reference symbols indicate corresponding parts, and in which.

Figure 3:
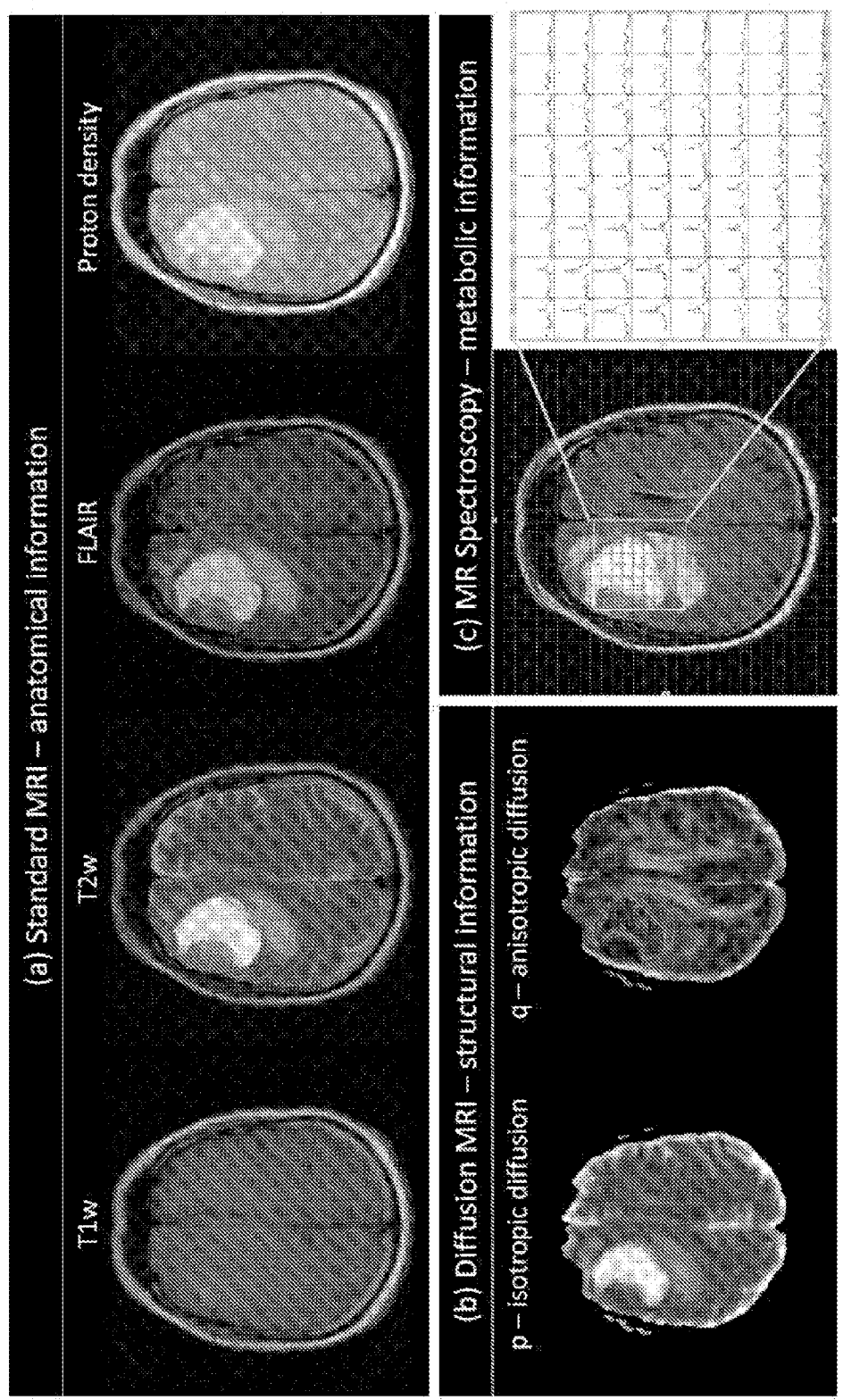

FIG. 3 depicts an example of different MR modalities shown for a tumour patient with a grade IV glioblastoma. The top row (a) shows standard MRI modalities that highlight anatomical information with different contrasts. Diffusion imaging (b) gives structural information in the form of diffusion properties p and q. A MR spectroscopy grid is shown on top of a FLAIR image in (c). MR Spectroscopy voxels are relatively large and contain metabolic information. MR spectra within the rectangular excitation volume are magnified for better visualization.

Figure 4:
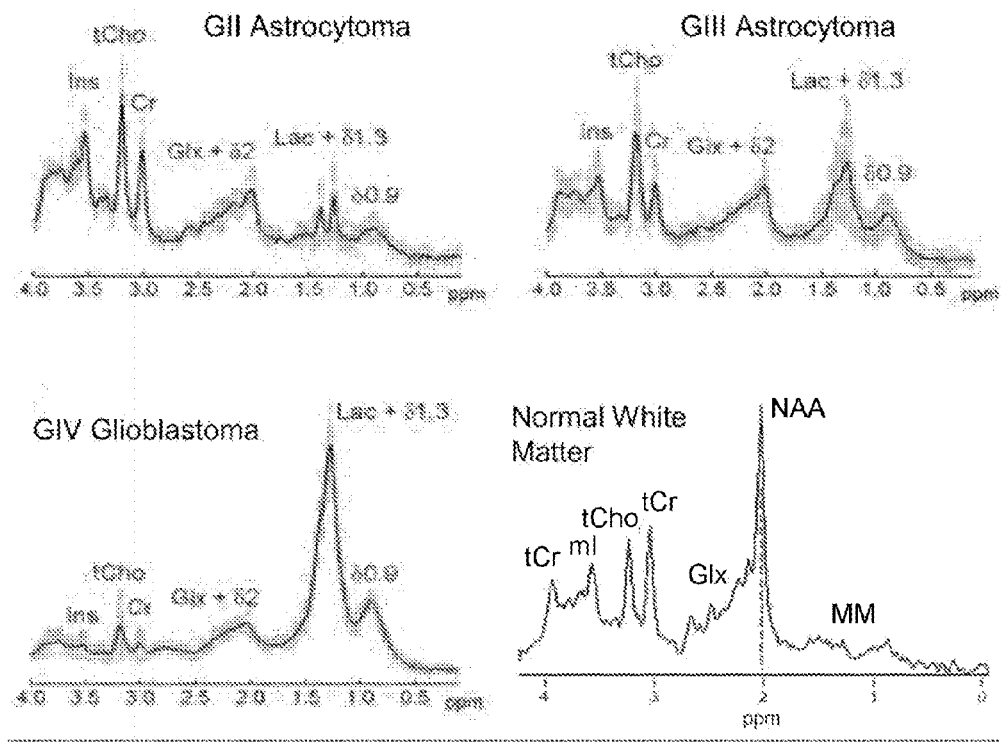

FIG. 4 depicts mean spectra (black line) and standard deviation (shaded area) of GII (top left), GIII (top right) and GIV (bottom left) gliomas respectively [i]. In comparison, a typical normal brain MR spectrum is shown on the bottom right [23]. The normal spectrum shows a typical peak at 2 ppm (broken line) corresponding to NAA which is an exclusive neuronal marker.

Figure 5:
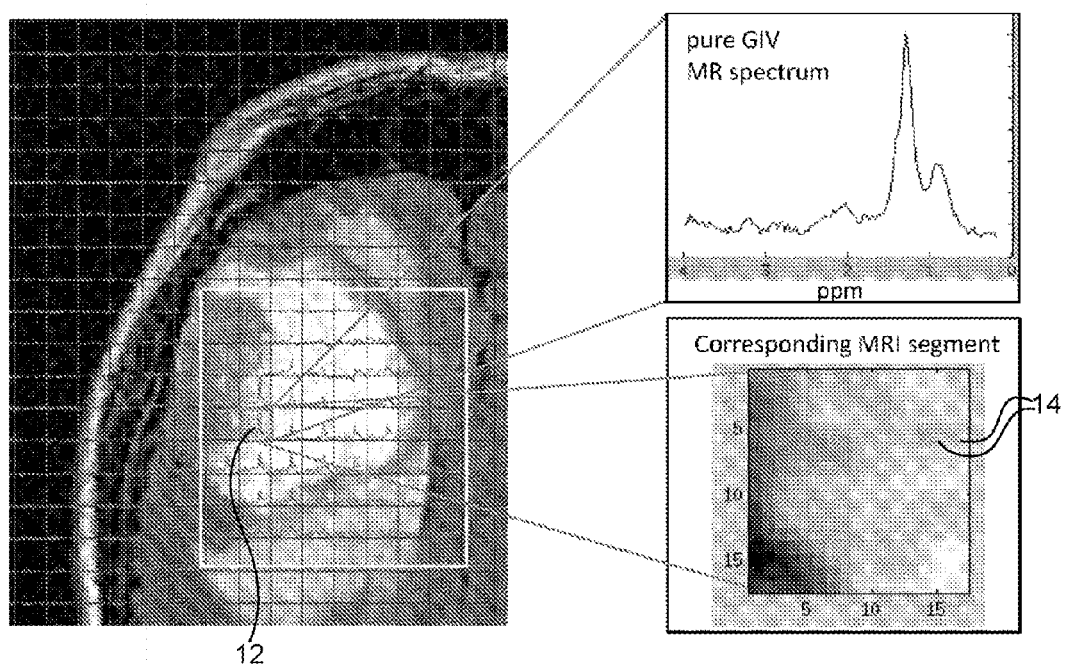

FIG. 5 depicts extracting of MRI information from an MRS voxel region corresponding to pure GIV tissue.

Figure 6:
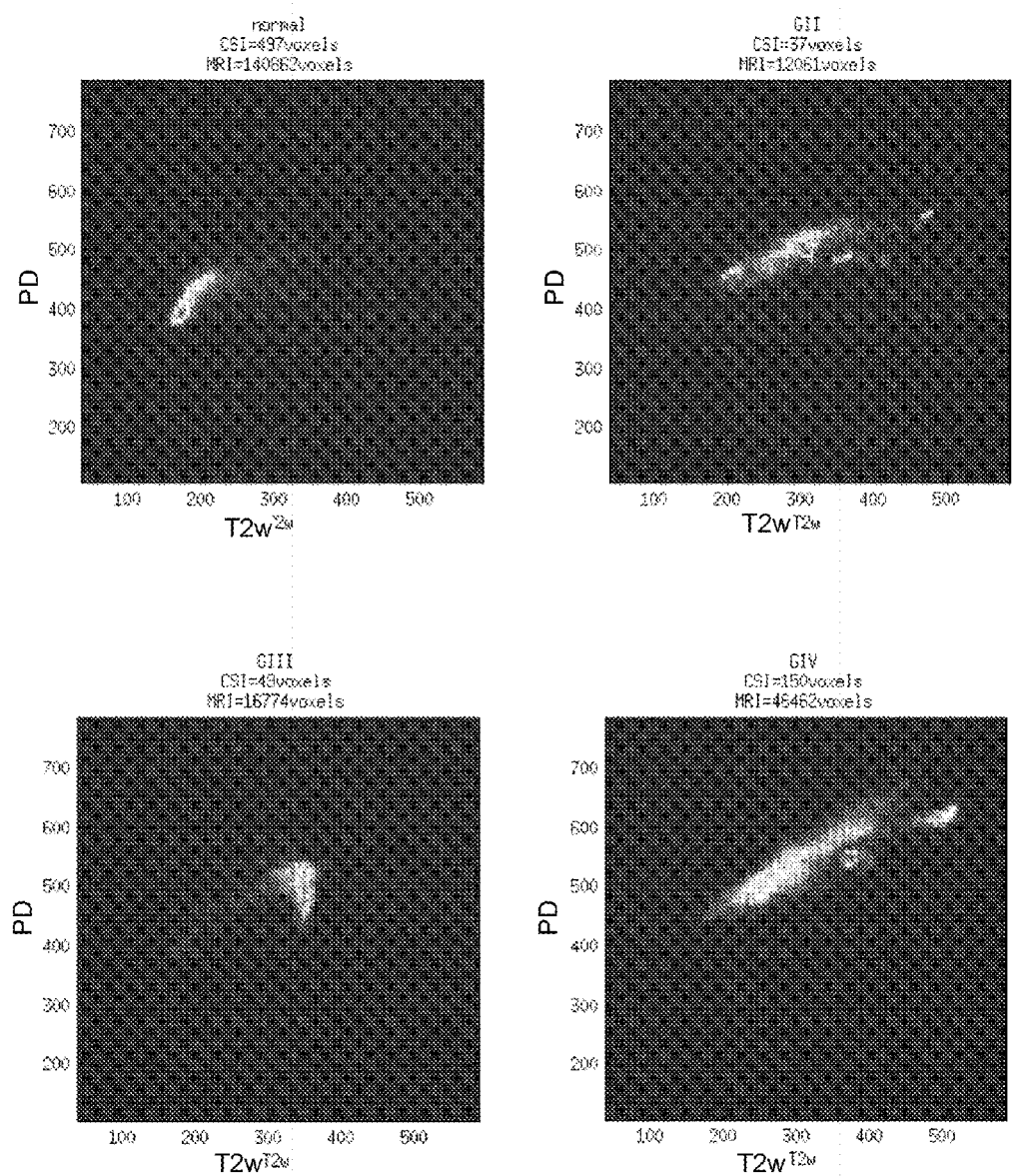

FIG. 6 depicts 2D T2w, PD PDFs for normal brain (N), top left, selected using MRS and for GII (top right), GIII (bottom left), GIV tumour (bottom right).

FIG. 7 depicts 2D p,q PDFs for GII, GIII and GIV tumour.

Figure 8:
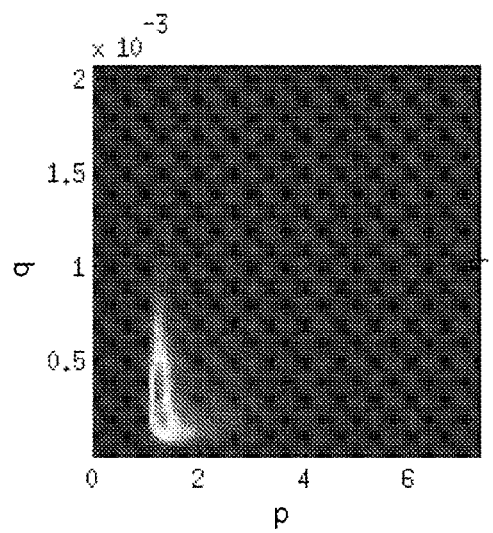

FIG. 8 depicts 2D p,q PDFs for normal brain selected using MRS.

Figure 9:
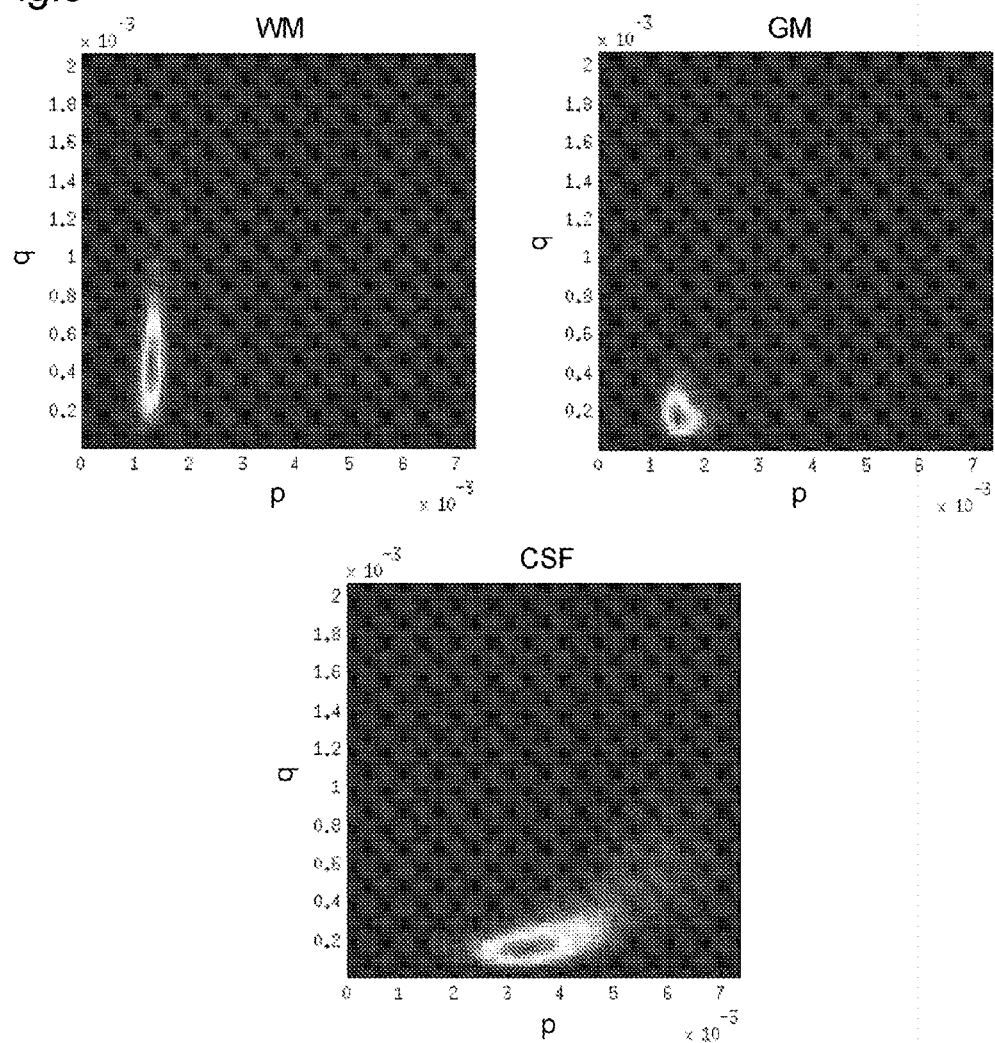

FIG. 9 depicts 2D p,q PDFs for normal brain selected using SPM segmentation into grey matter (GM), white matter (WM) and cerebro-spinal fluid (CSF).

Figure 10:
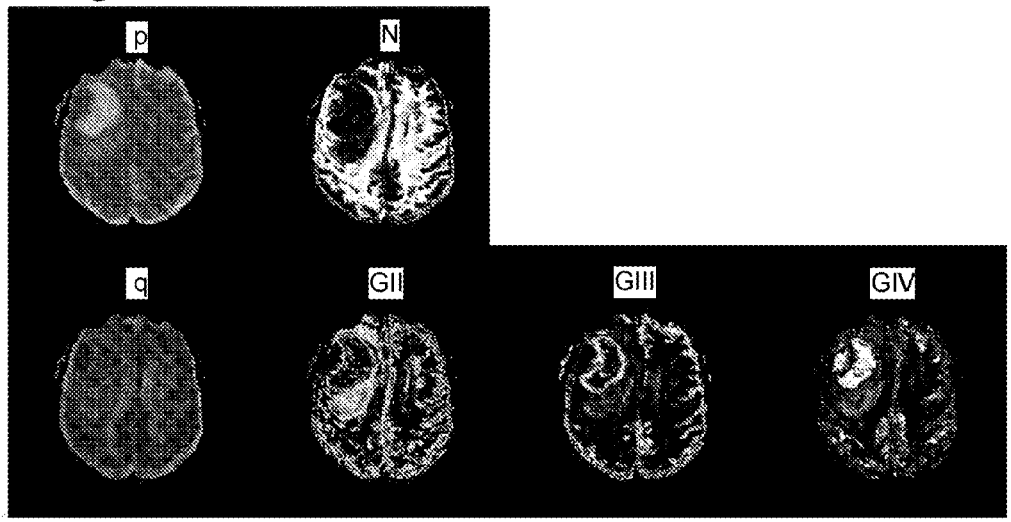

FIG. 10 depicts probability maps for a GIV glioblastoma using normal brain distributions selected with MRS and DTI p and q.

Figure 11:
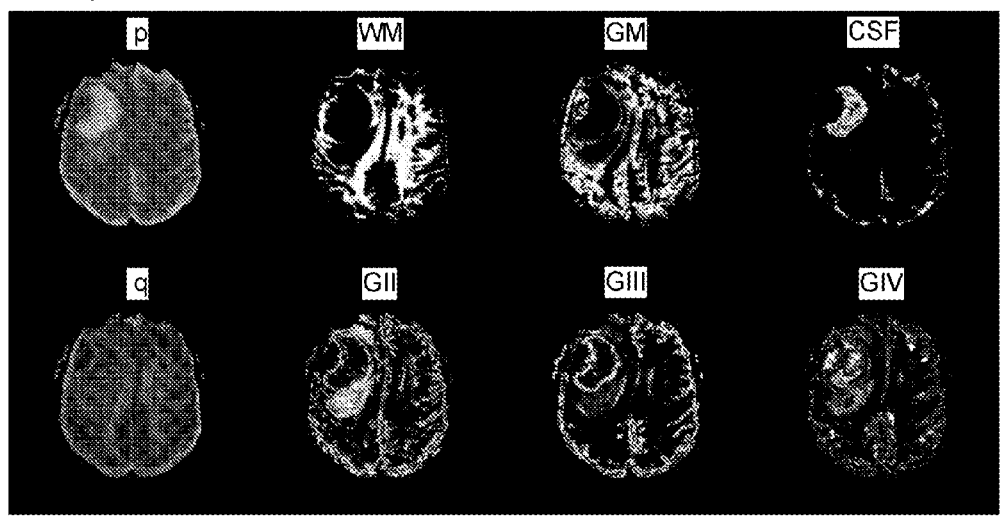

FIG. 11 depicts probability maps for a GIV glioblastoma using normal brain distributions selected with SPM segmentation and DTI p and q.

Figure 12:
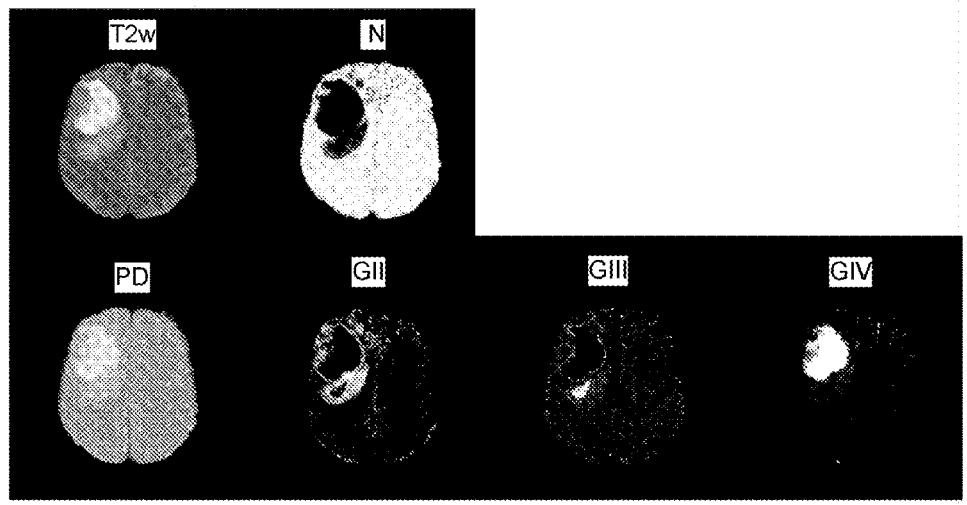

FIG. 12 depicts probability maps for GIV glioblastoma using normal brain distributions selected with MRS and T2w and PD.

Figure 13:
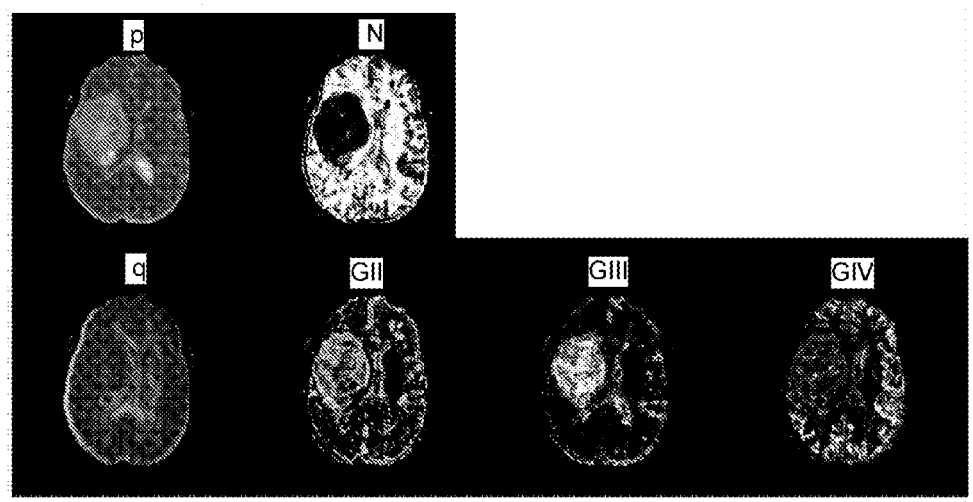

FIG. 13 depicts the probability maps of FIG. 10 in the case of a GIII anaplastic astrocytoma.

Figure 14:
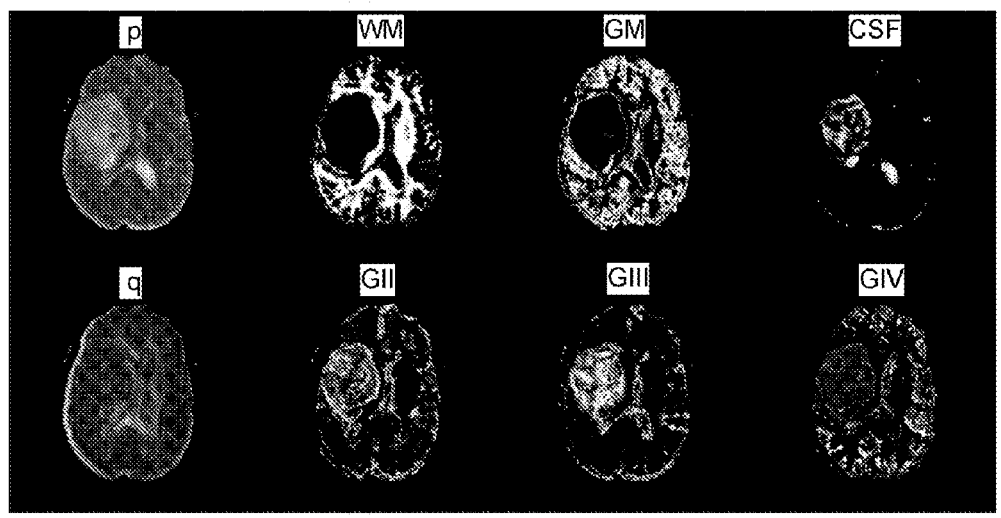

FIG. 14 depicts the probability maps of FIG. 11 in the case of a GIII anaplastic astrocytoma.

Figure 15:
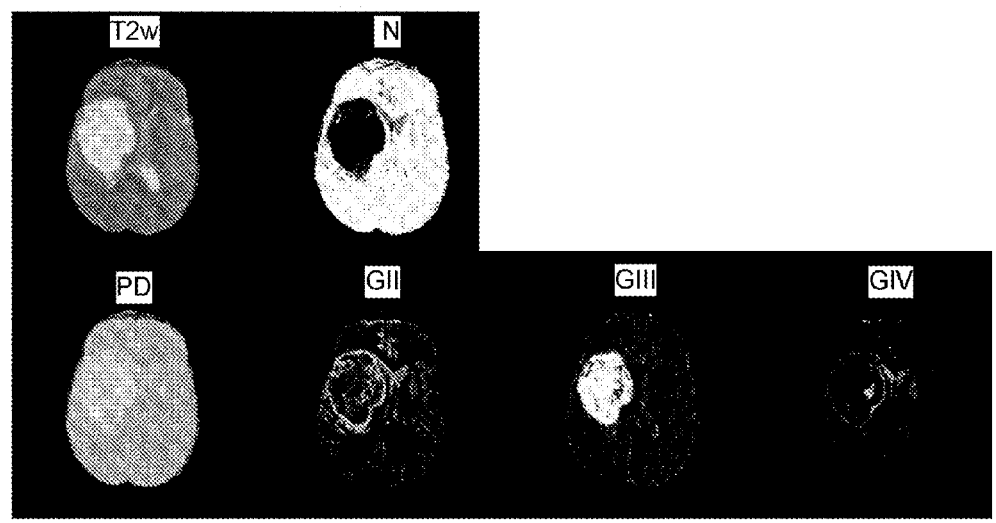

FIG. 15 depicts the probability maps of FIG. 12 in the case of a GIII anaplastic astrocytoma.

Figure 16:
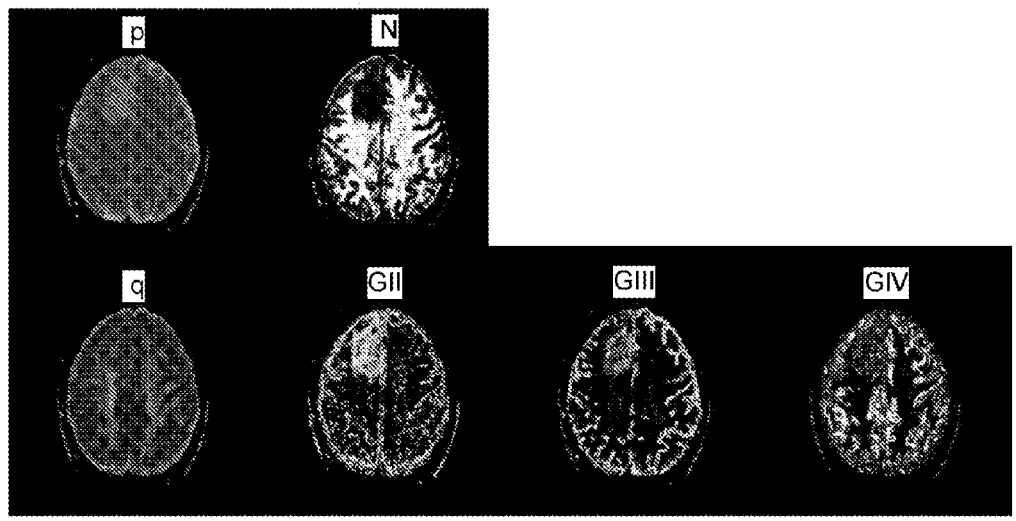

FIG. 16 depicts the probability maps of FIG. 10 in the case of a GII astrocytoma.

Figure 17:
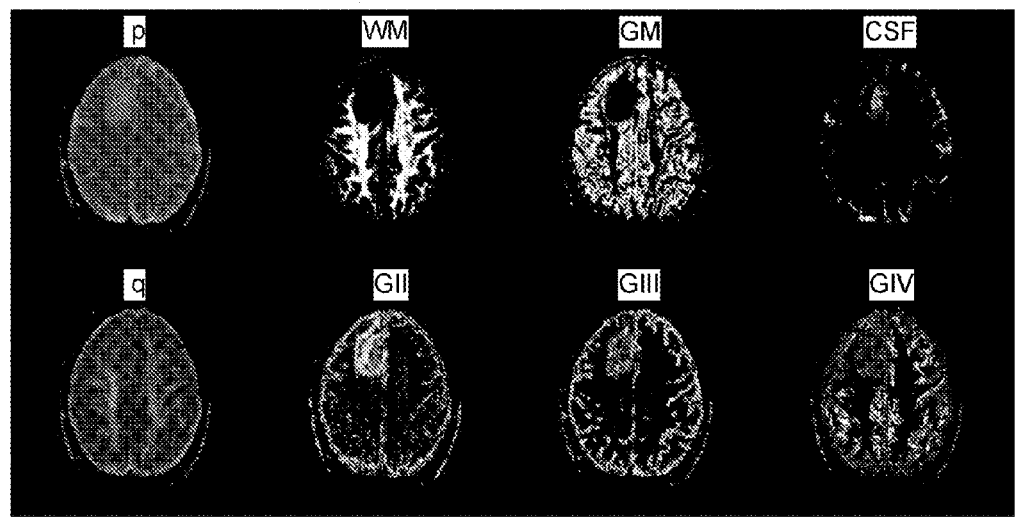

FIG. 17 depicts the probability maps of FIG. 11 in the case of a GII astrocytoma.

Figure 18:
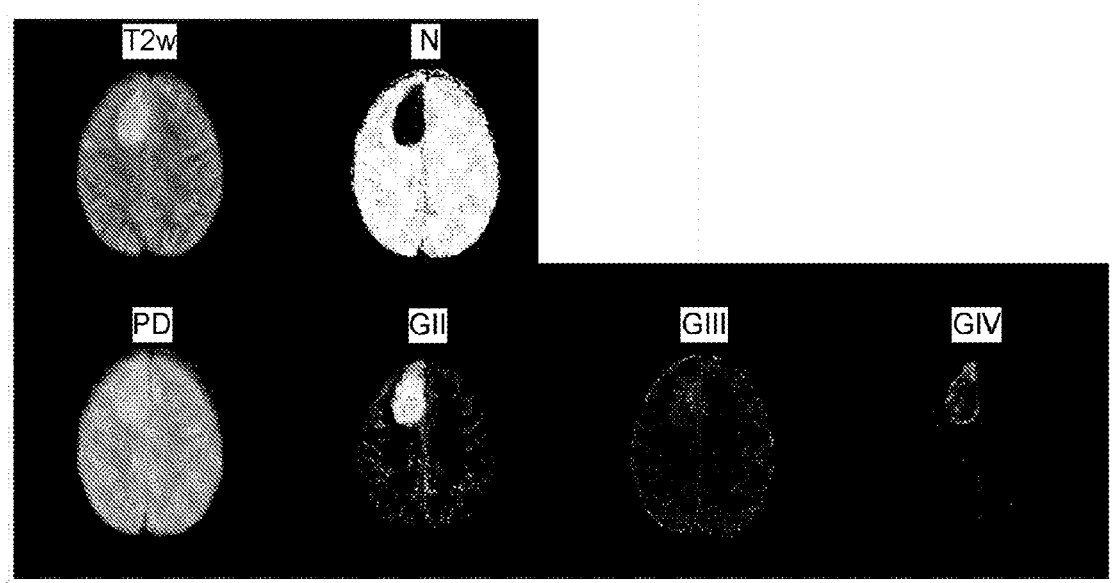

FIG. 18 depicts the probability maps of FIG. 12 in the case of a GII astrocytoma.

Figure 19:
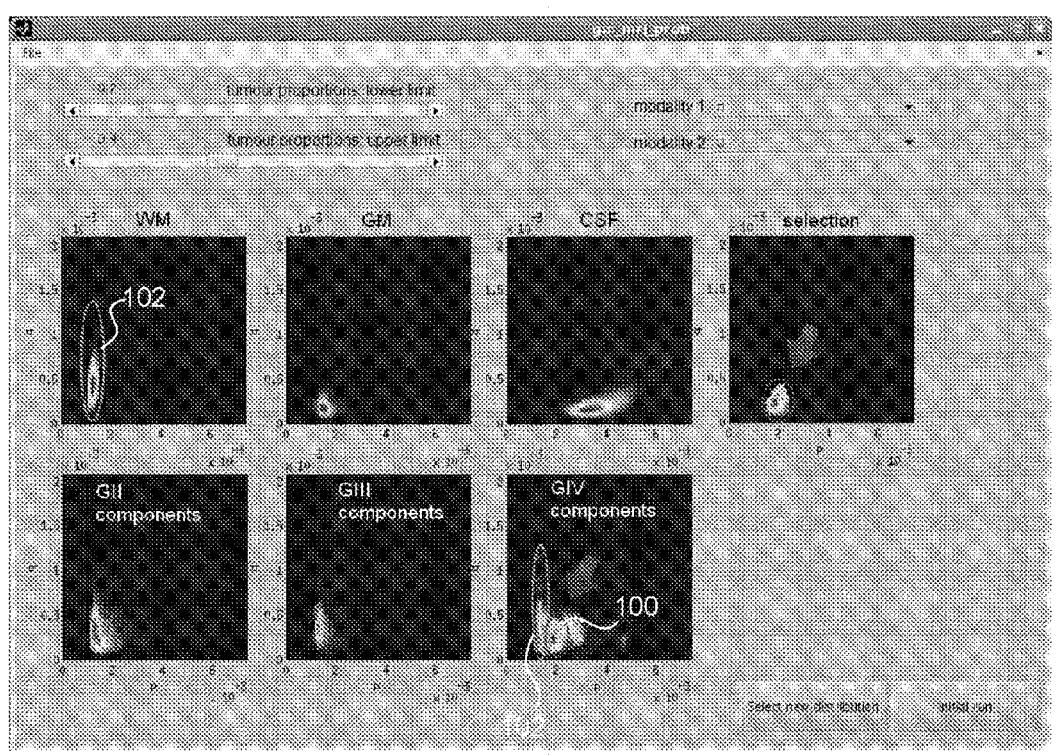

FIG. 19 depicts a screen-shot of an early stage MATLAB GUI configured to allow selection of custom regions within 2D p,q distributions. The sliders at the top allow to select how much tumour tissue is allowed within an MRS voxel using a previously published methodology [29]—in this case 20%-40% and the corresponding distributions for GII, GIII and GIV are displayed below. Particularly the GIV distribution shows two distinct clusters. One of which is most likely corresponding to normal brain (elliptical region) and the other to tumour infiltration (circular region). The potential tumour infiltration is selected as a separate distribution (bottom left) and mapped back to the GIV example of FIGS. 10-12. The result is an additional probability map, indicative of tumour infiltration, as shown in FIG. 20.

Figure 20:
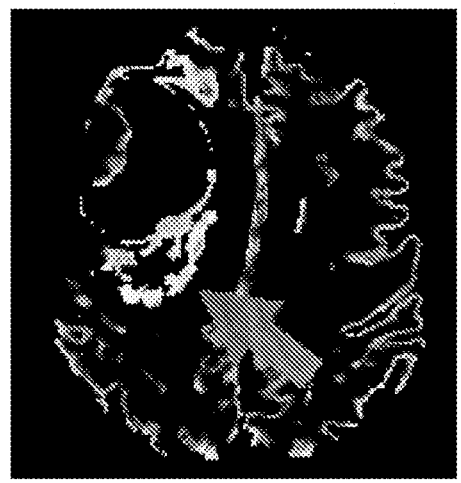

FIG. 20 depicts an additional probability map indicative of tumour infiltration.

Figure 21:
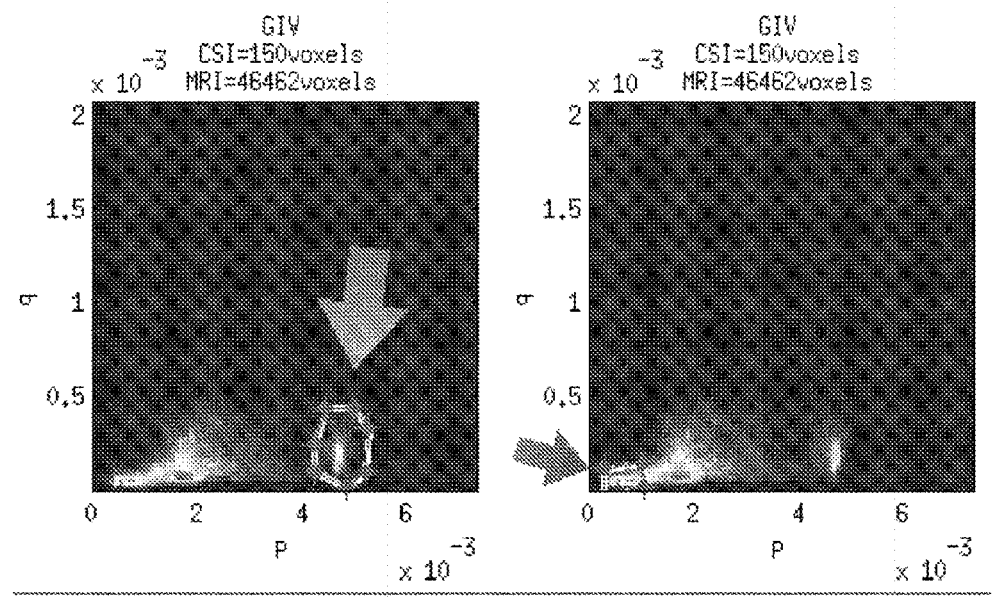

FIG. 21 depicts the selection ("Selection 2") of necrosis or cystic regions in p, q probability density functions, indicated by higher p and q values (left diagram), and the selection ("Selection 1") of dense tumour core indicated by very low p and q values.

Figure 22:
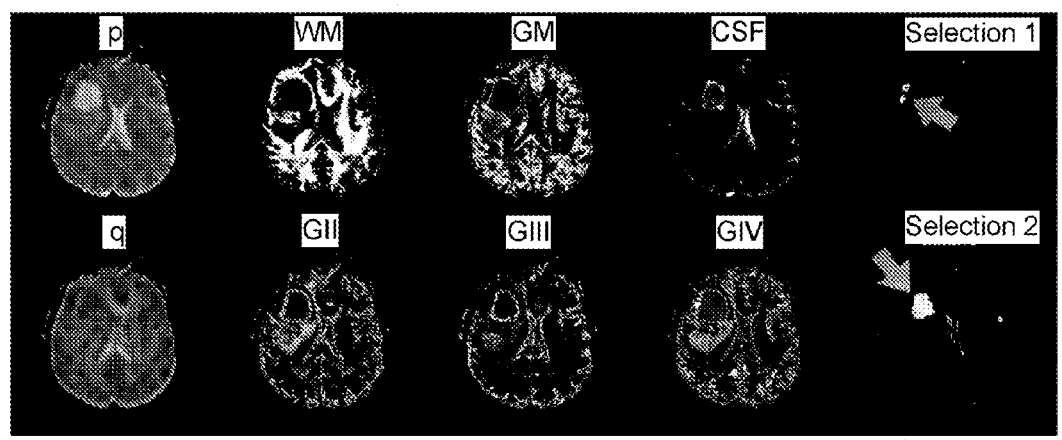
Figure 24A:
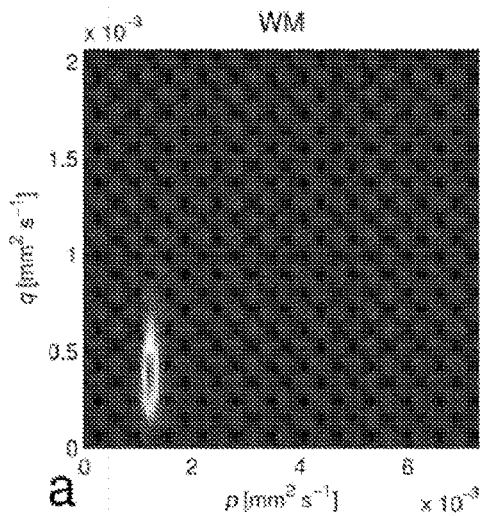
Figure 24B:
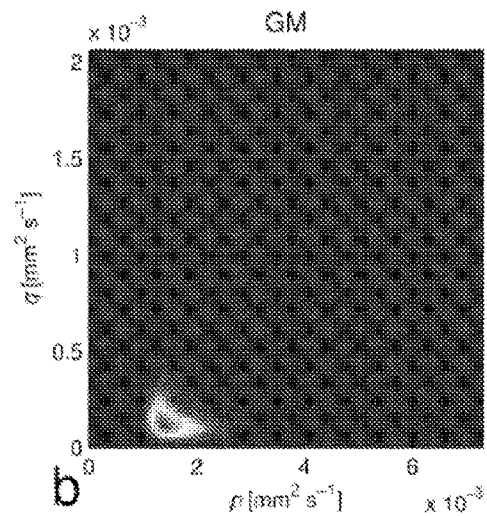
Figure 24C:
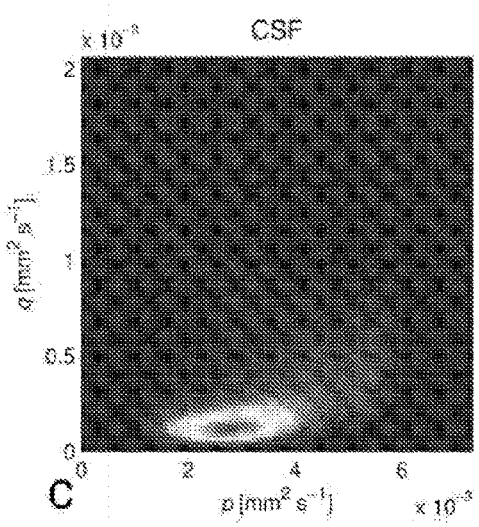
Figure 24D:
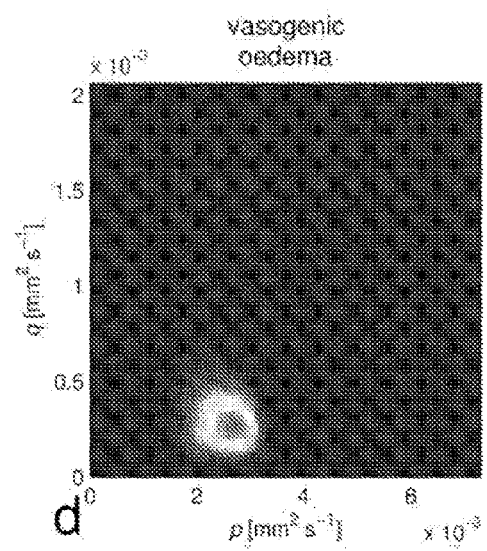
Figure 24H:
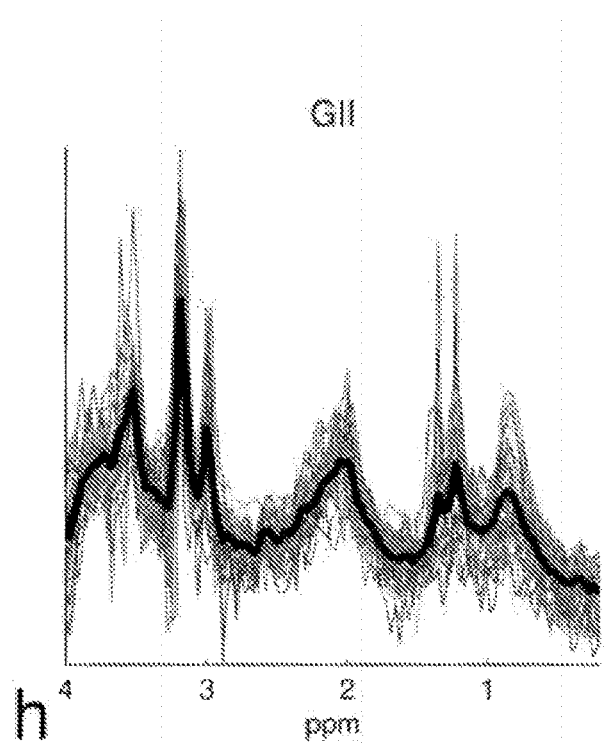
Figure 24I:
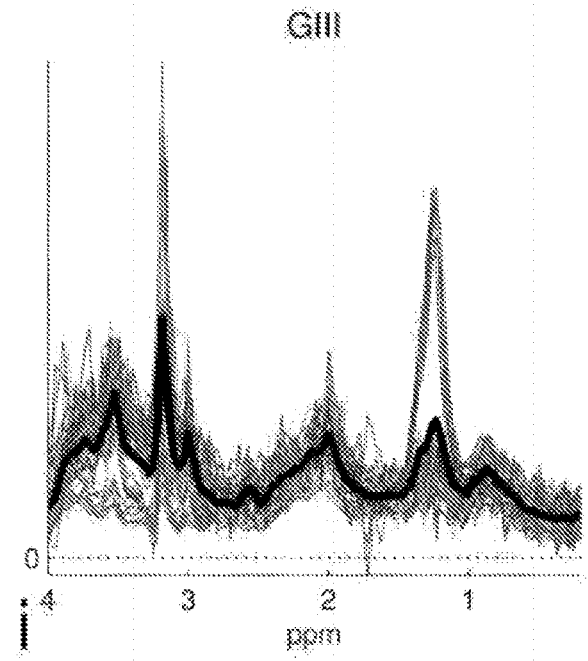
Figure 24J:
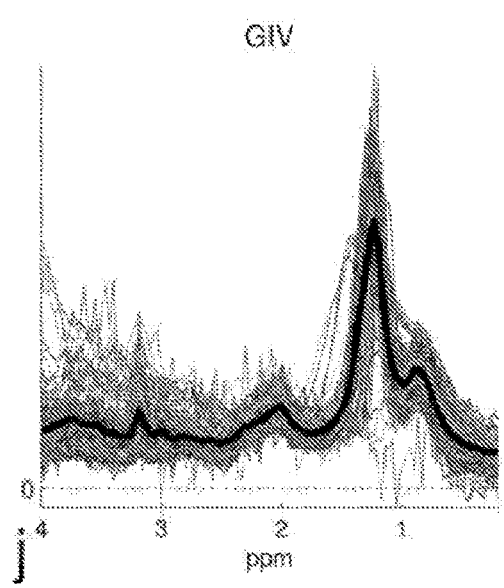

FIG. 22 depicts the result of mapping the selection of FIG. 21 onto the same GIV glioblastoma patient shown in FIGS. 10-12: a new probability map indicating necrosis or cystic regions is obtained using the Selection 2 (bottom right) and a new probability map indicating dense tumour core is obtained using Selection 1 (top right).

FIG. 23 depicts a graph of [Cho] against [NAA] to illustrate a prior art CNI method of processing MRS data to identify the tissue type of voxels in a volume of tissue.

FIG. 24(a-g) depicts refined 2D PDFs in p,q space.

FIG. 24(h-j) depict MRSI spectra and their corresponding mean selected to represent the glioma tumour tissue.

Figure 25:
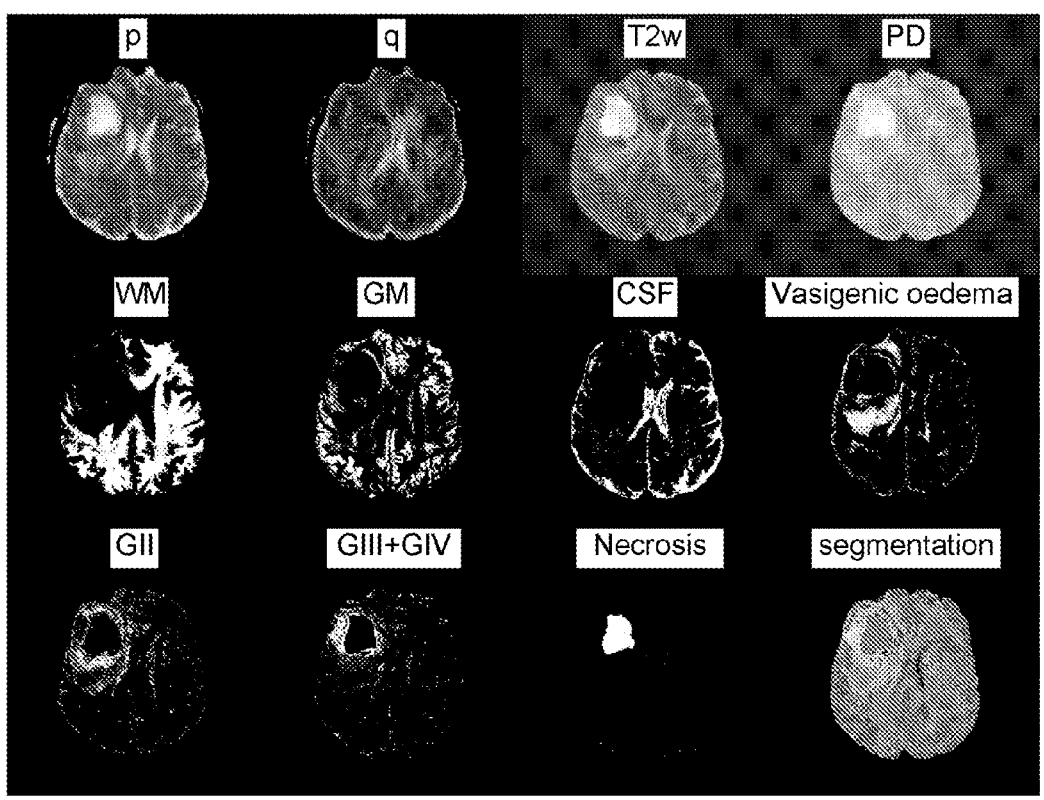

FIG. 25 depicts segmentation of an example GIV case using four imaging modalities.

Figure 26:
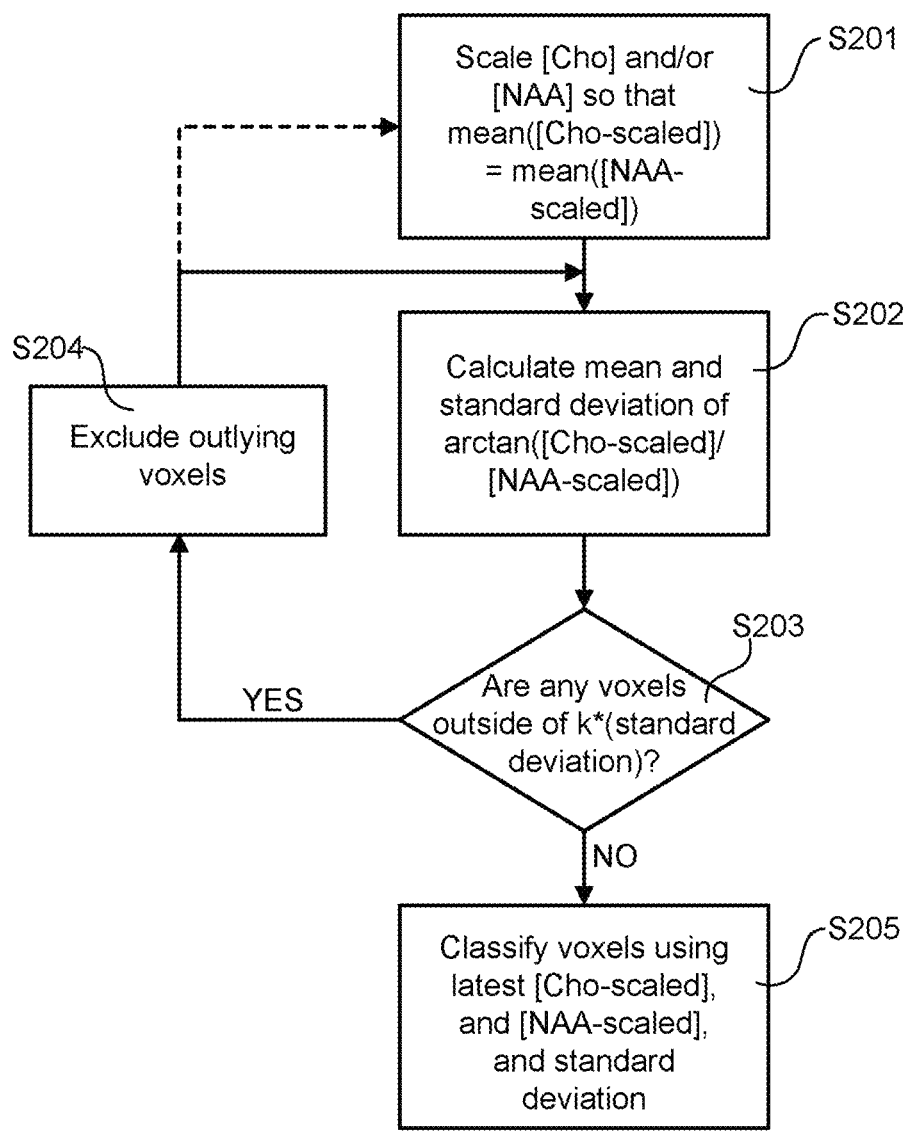

FIG. 26 depicts a flow chart to illustrate an rCNI method of processing MRS data to identify the tissue type of voxels in a volume of tissue.

Figure 27:
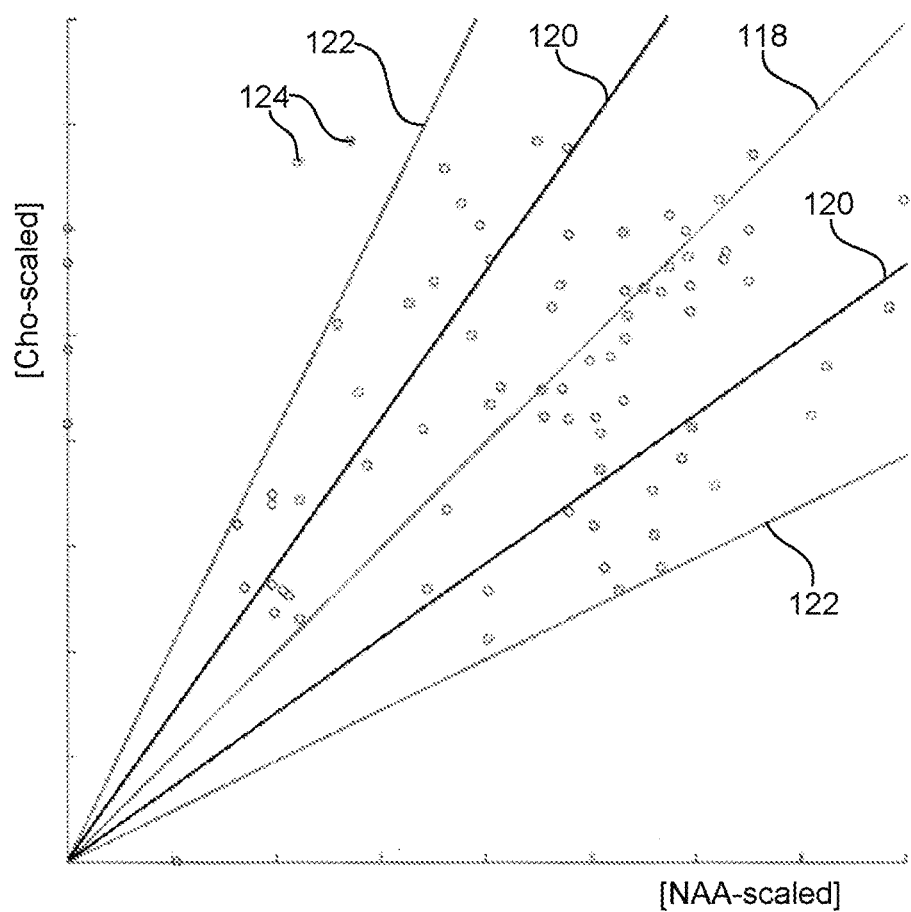

FIG. 27 depicts a graph of [Cho-scaled] against [NAA-scaled] to illustrate application of the rCNI method of FIG. 26.

Figure 28:
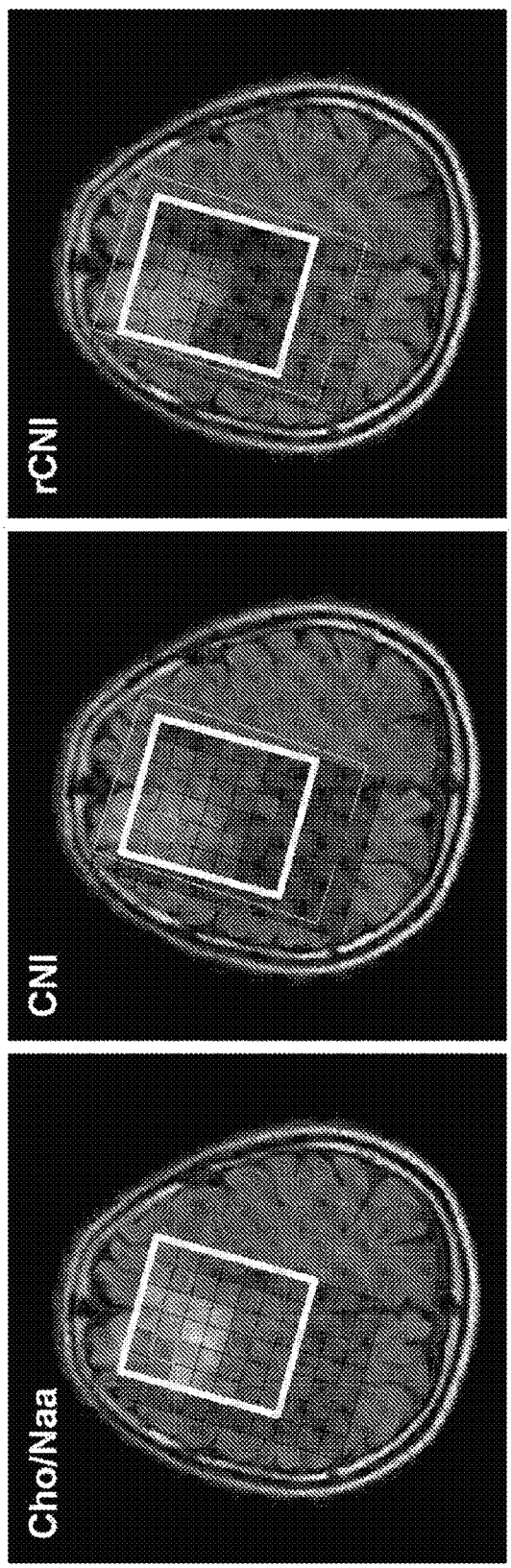

FIG. 28 depicts how the rCNI method reduces the overestimation of abnormal tissue.

Figure 29:
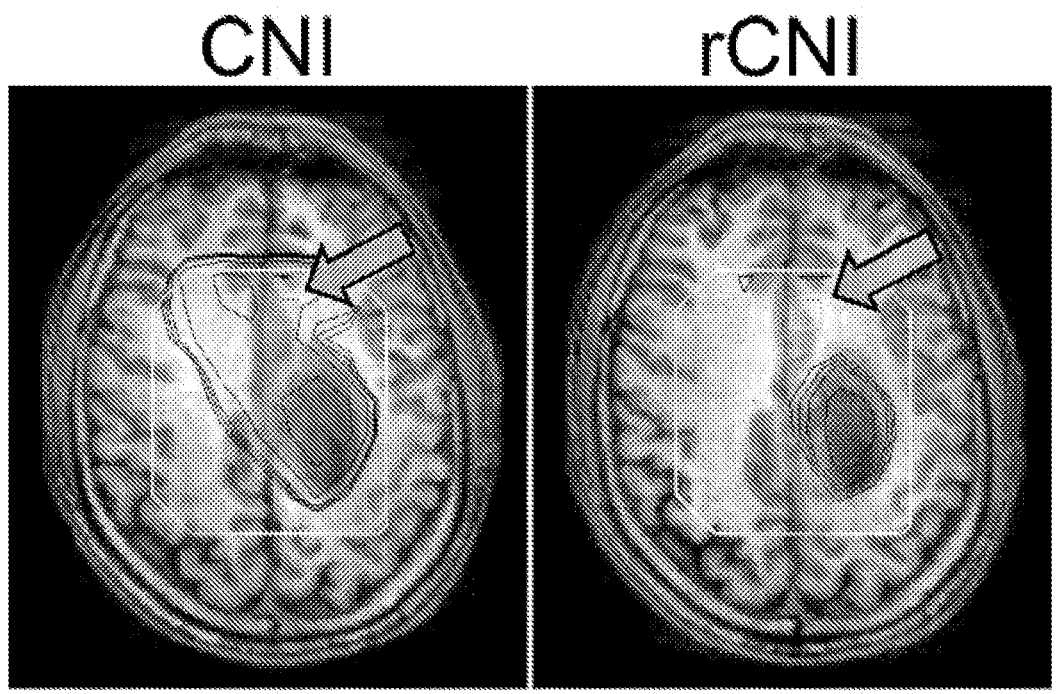

FIG. 29 is a further depiction of how the rCNI method reduces overestimation of abnormal tissue based on contours.

Figure 1:
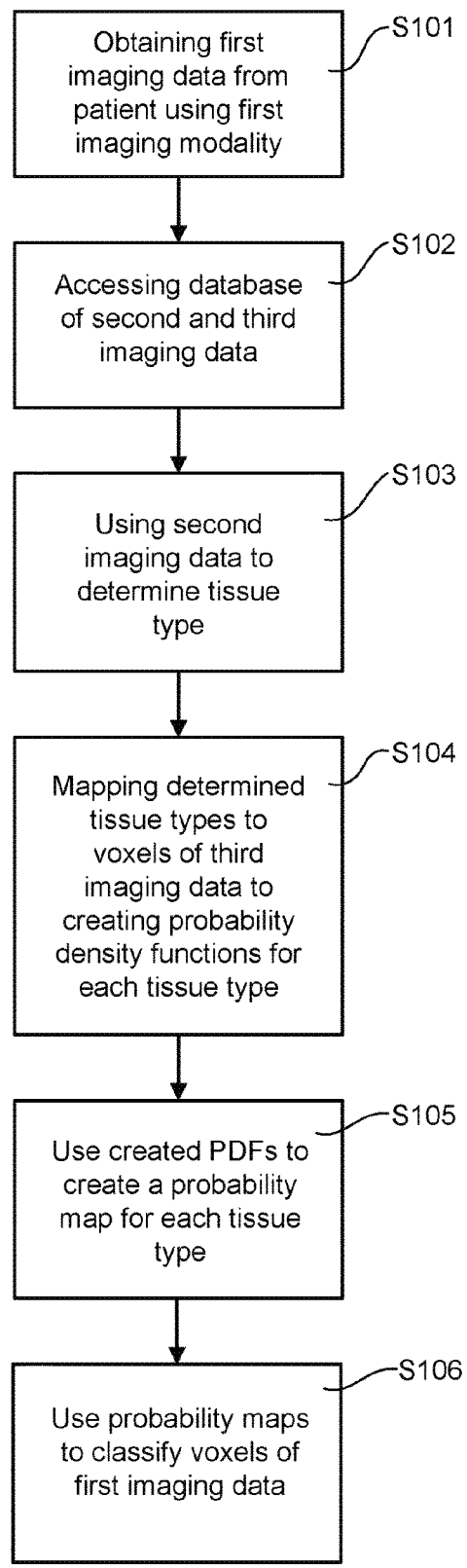
FIG. 1 depicts a flow chart illustrating a method of processing first imaging data obtained using a first imaging modality, using data obtained using a second imaging modality, to assign tissue types to the first imaging data voxels.

A method according to an embodiment is described below with reference to FIG. 1. The method enables tissue type classification to be performed more effectively than prior art methods by means of a novel approach of combining information obtained from different imaging modalities. In an embodiment, the method enables relatively high resolution classification to be achieved by combining lower resolution imaging data that is highly effective for determining tissue type with higher resolution imaging data.

In a first step S101, first imaging data is obtained from a patient. The first imaging data is obtained using a first imaging modality. In an embodiment, the first imaging data comprises data from a plurality of different first imaging modalities. Each first imaging modality is capable of obtaining data at a characteristic spatial resolution, which is referred to below as a "first spatial resolution". There may be several different "first spatial resolutions" where a plurality of different first imaging modalities are used. The first imaging data is obtained from a volume of interest within the patient. The volume of interest may be a portion of the patient's brain, for example.

In an embodiment, one or more of the first imaging modalities is a based on Magnetic Resonance (MR), Computerized Tomography (CT), or Positron Emission Tomography (PET). The one or more first imaging modalities may comprise a Magnetic Resonance Imaging (MRI)/Diffusion Tensor Imaging (DTI) modality, for example.

Each of the first imaging modalities comprises a value of a first parameter associated with the first imaging modality for each of a plurality of first imaging data voxels. The overall aim of the method is to assign each of the first imaging data voxels to one tissue type from a plurality of possible tissue types in a predetermined classification scheme.

In an embodiment, the predetermined classification scheme comprises one or more tissue types corresponding to normal tissue types and one or more tissue types corresponding to tumour tissue. In an embodiment, the one or more normal tissue types comprise one or more of the following: normal brain tissue (irrespective of whether the normal brain tissue is white matter, gray matter or cerebrospinal fluid), normal white matter, normal gray matter, normal cerebrospinal fluid. In an embodiment, the one or more tissue types corresponding to tumour tissue comprise one or more of the following: GII tumour type, GIII tumour type, GIV tumour type. In an embodiment, the tissue types are all pure tissue types but this is not essential. In other embodiments, the predetermined classification scheme may comprise one or more tissue types that consist of tissue that comprises predetermined proportions of one of more pure tissue types, for example one or more pure normal tissue types and/or one or more tumour tissue types.

In a subsequent step S102, a reference database of second and third imaging data is accessed. The second imaging data is obtained from at least one reference tissue volume or volumes using a second imaging modality. The second imaging modality has a characteristic spatial resolution, which is referred to below as a "second spatial resolution". The second spatial resolution may be equal to, lower or higher than each of the first spatial resolutions of each of the first imaging modalities. In an embodiment, the second spatial resolution is lower than at least one of the first spatial resolutions. However, in an embodiment, the second imaging modality is more effective than at least one of the first imaging modalities at determining the tissue type of its voxels, at least for certain tissue types. The second imaging data comprises a value of a second parameter associated with the second imaging modality for each of a plurality of second imaging data voxels. The second imaging data voxels will be larger than the first imaging data voxels where the resolution of the second imaging modality is lower than the first imaging modality.

In an embodiment, each of the first imaging modalities and/or the second imaging modality each comprise a different modality that is based on one of the following: Magnetic Resonance (MR), Computerized Tomography (CT), Positron Emission Tomography (PET). In an embodiment, the second imaging modality is a Magnetic Resonance Spectroscopy (MRS) modality. In an alternative embodiment, the second imaging modality comprises perfusion imaging. In an embodiment, a plurality of different second imaging modalities are used.

In an embodiment, the third imaging data is data taken from the same reference tissue volume or volumes as the second imaging data but uses the first imaging modality (or modalities) to obtain the data. The third imaging data is defined relative to a plurality of third imaging data voxels. In an embodiment, the third imaging data voxels are the same size as the first imaging data voxels but this is not essential. Where a plurality of first imaging modalities are used there will be a corresponding plurality of third imaging data sets, along with corresponding sets of third imaging data voxels (which may be the same size or of different sizes). The third imaging data comprises a value of the first parameter for each of the plurality of third imaging data voxels (where there are a plurality of first imaging modalities there will be a corresponding plurality of values for each voxel). The voxels of the second and third imaging data overlap in the reference tissue volume or volumes so that a given volume can be defined by reference both to a plurality of second imaging data voxels and (optionally a different, for example larger, number of) third imaging data voxels.

In a subsequent step S103, the second imaging data is used to identify the tissue type according to the predetermined classification scheme in a plurality of the second imaging data voxels in the reference tissue volume or volumes. This may be achieved in a variety of ways depending on which second imaging modality is used. Detailed examples are given below for the case where the second imaging modality is an MRS modality. The second imaging data may be used on its own to determine tissue type or in combination with other reference data. For example, in the case where the classification scheme comprises a plurality of different tumour tissue types, MRS data may be combined with other reference data, for example data obtained by biopsy and histopathological analysis. The MRS data may thus determine accurately a plurality of voxels that correspond to tumour or a limited range of tumour grades and the histological data may provide further information or confirmation about which grade of tumour is involved.

In subsequent step S104, a mapping is performed to identify, for each tissue type, which third imaging data voxels correspond to one or more second imaging data voxels of that tissue type. In this way, a set of third imaging data voxels are identified for each of the tissue types. Each of the sets is then used to determine a probability density function (PDF) for each of the tissue types. The PDF represents the expected distribution of values of the first parameter for each of the tissue types.

In the detailed discussion below, the PDFs are referred to as $p(X|\omega_i)$, where X is the voxel value and $\omega_i$, i=1, . . . , L is the ith tissue type. If there are plurality n of first imaging modalities, then X will be a vector $X=(x_1, x_2, \ldots, x_n)$. The PDF corresponds to the histogram that would be obtained by performing a count of the number of third imaging data voxels in each of a finite number of ranges of the value of the first parameter in the limit that the width of each range tends to zero. For example, a 1D PDF could be represented on a graph in which the y-axis shows the probability and the x-axis shows the intensity values X of a known tissue type. The terminology $p(X|\omega_i)$ therefore gives the probability p of a tissue type $w_i$ to contain the voxel value X. In an embodiment, a Bayes theorem analysis (described below) is then later used to calculate the final posterior probability $P(\omega_i|X)$ of a voxel having voxel value X belonging to tissue class $w_i$.

Each of the PDFs will in general extend over a range of values. One or more of them may resemble a Gaussian distribution but in general will not do so. Indeed, one of the important insights of the inventors is that the values will not necessarily be simply Gaussians (which tend to represent mere random distributions of values, which might occur due to signal noise for example). Instead, the distribution of values will tend to be characteristic of the particular tissue type due to tissue complexity and heterogeneity. Building this information into the PDFs contributes to the PDFs providing an improved way of mapping first parameter values to tissue type.

PDFs for different tissue types will tend to have peaks that are separate from each other but may overlap for particular ranges of first parameter values. However this is not essential. In other embodiments, there may be little or no overlap between the PDFs or only one tissue type.

In the detailed example discussed below, it is described how for example the Bayes theorem may be used to determine the probability of a voxel belonging to one of the tissue classes.

In step S105, the PDFs are used to assign probabilities for all tissue types to the first imaging data voxels of the first imaging data taken from the patient e.g. using the Bayes theorem. Thus, steps S102, S103 and S104 operate on data that is taken from a reference tissue volume or volumes (i.e. from tissue that does not necessarily belong to the patient under study), while step S105 uses the results of steps S102, S103 and S104 to provide an improved analysis of the data taken from the patient. The result is that the first imaging data taken using the first imaging modality may be used to obtain probability maps (PM) of tissue type data, at the resolution of the first imaging modality, even though the first imaging modality on its own may not be intrinsically well suited to determining tissue type. The number of obtainable PMs is equal to the number of tissue types. A PM gives a voxel wise relative probability of a voxel belonging to each of the tissue classes. The normalised sum of all probabilities for all tissue types for each voxel may be 1 or alternatively 0 if all PDFs at that voxel value X are zero. Furthermore, although the analysis of steps S102, S103 and S104 has to be performed at some stage and this analysis will inevitably involve use of second imaging modality that is not the same as the first imaging modality, the analysis does not need to be repeated each time a new patient is studied. The benefits of the second imaging modality (and any associated biopsy and histopathological analysis) are thus obtained without the second imaging modality (and biopsy) having to be used on the particular patient in question. The patient can benefit from the correlation that has been determined to exist by steps S102, S103 and S104 between the second and third imaging data obtained from other patients/subjects.

In step S106, the PMs calculated in step S105 can be used to assign each voxel of the first imaging data taken from the patient to a tissue class. This can be done for example by assigning each voxel to the most probable tissue class or using classification algorithms such as linear discriminant analysis (LDA) or support vector machines (SVM). In an embodiment, PMs of different tissue classes can be added (e.g. adding PMs of all tumour types to obtain a probability map for tumour and/or adding PMs of all normal tissue types, for example WM and GM, to obtain a probability map for normal tissue) before classification.

In an embodiment, at least one of the first imaging modalities is able to obtain information from a higher proportion of the volume of tissue of the patient than the second imaging modality. This is the case for example where the first imaging modality is an MRI/DTI modality and the second imaging modality is an MRS modality. In such a situation, the method is capable of obtaining tissue type information in regions of tissue that the second imaging modality cannot normally access (e.g. in the case of MRS, peripheral regions of the brain).

In embodiments using plural different first imaging modalities, a multi-dimensional PDF may be created for each tissue type, with one dimension for each of the first imaging modalities. For example, if the PDF has been created based on third imaging data corresponding to a first imaging modality and two further first imaging modalities, the PDF will have three dimensions. A probability density for a given voxel can then be obtained by entered the first parameter value of the voxel for each of the three first imaging modalities supported.

In an embodiment, the one or further first imaging modalities may be one of the following: T1-weighted (T1w), T2-weighted (T2w), Fluid attenuated inversion recovery (FLAIR), proton density imaging (PD), diffusion tensor imaging modality p (DTI p), or diffusion tensor imaging modality q (DTI q), diffusion tensor imaging modality MD, diffusion tensor imaging modality FA. FIGS. 6-9 illustrate examples of two dimensional (2D) PDFs in which the horizontal and vertical axes represent first and further first imaging modalities, respectively, and the intensity indicates probability. The data was obtained from 26 glioma patients as described below in the detailed example. FIG. 6 shows 2D PDFs in which the first modality is MRI PD and a further first modality is MRI T2w (for each of three different tissue type patients: GII, GIII and GIV). FIG. 7 illustrates examples of alternative 2D PDFs in which the first modality is DTI p and a further first modality is DTI q (for each of GII, GIII and GIV). FIG. 8 shows a 2D PDF of the type shown in FIG. 7 for normal tissue (irrespective of which particular type of normal brain tissue). FIG. 9 shows 2D PDFs of the type shown in FIG. 7 for WM, GM and CSF types of normal brain tissue.

The data in the reference database may be obtained from one subject or from a plurality of different subjects. In the case where the data is obtained from different subjects a transformation may be carried out on the data to maximise a correlation between data from different subjects. This transformation makes it possible for data obtained from different subjects to be compared effectively, which would not otherwise be possible for many different types of imaging modalities. For example, whereas DTI derived p and q maps, which provide quantitative isotropic and anisotropic diffusion magnitudes (in $mm^2s^{-1}$) at each pixel, most standard MRI modalities (e.g. T1w, T2w, PD and FLAIR) only provide qualitative pixel intensities, which cannot be directly compared between patients. In an embodiment each set of third imaging data obtained from a given one of a plurality of different subjects is subjected to a linear transformation that maximizes a correlation between a probably density function derived from the set of third imaging data from that subject and a probability density function of the same type derived from a set of third imaging data from a reference subject. The transformation process may be referred to as PDF/histogram equalization.

In a particular example, the following transformation is applied to all multislice MRI data $S_i$:

$$S_i' = aS_i + b, a \in \Re, b \in N, \tag{1}$$

with a and b being determined such that the correlation coefficient between the PDF/histogram of the transformed MRI data and a randomly chosen reference MRI patient data set is maximized. In an embodiment, the MRI data may be skull stripped (e.g. to remove the influence of non-brain tissue such as the skull) before the transformation. Where applied to the study of tumour tissue in the brain, the method is particularly effective where intensity variations caused by the brain tumour are small compared to the intensities contributed by normal tissue in the whole brain. This will normally be the case because brain lesion volume generally represents a relatively small proportion of the whole brain.

Histogram equalization is in principle not a new technique. Previous publications have however used different techniques for normalization in order use qualitative MRI data in a quantitative manner. In [21] MRI images were individually assessed by two neuroradiologists and given a discrete score. In [16], regions of interest (ROIs) were drawn on MRI in the tumour and contra-lateral side of the brain. The tumour MRI values were normalized by the mean MRI values of the normal brain ROI.

The method presented here is more robust against intensity outliers and might hold potential to obtain quantifiable MRI data from other scanners and field strengths to either apply the proposed probability mapping methodology or other common analysis methods.

In an embodiment, each voxel is assigned to a tissue type that has the highest posterior probability (this is one possible example for the classification referred to above with reference to S106), $P(\omega_i|X)$, $P(\omega_i|X)$ being given by:

$$P(\omega_i | X) = \frac{P_i p(X | \omega_i)}{\sum_{i=1}^{L} P_i p(X | \omega_i)},$$

wherein $\omega_i$, i=1, ..., L identifies the ith tissue type among L possible tissue types in the classification scheme, X represents the voxel intensities, $p(X|\omega_i)$ represents the probability density function for tissue type $\omega_i$, and $P_i$ represents the a priori probability. As explained above, if there are multiple imaging modalities n, X will be a vector X=(x1, x2, ..., xn).

In an embodiment, the following expression is used to obtain the a priori probability:

$$P_i = \frac{p(X|\omega_i)}{\sum_{i=1}^{L} p(X|\omega_i)}.$$

The $P(\omega_i|X)$ may be determined iteratively by using the posterior probabilities from a first iteration to calculate the a priori probabilities for the next iteration. Additionally or alternatively, the $P(\omega_i|X)$ may be determined iteratively by using the posterior probabilities from a first iteration to refine the probability density functions $p(X|\omega_i)$ of the next iteration. A detailed example illustrating use of these expressions is given below.

Figure 2:
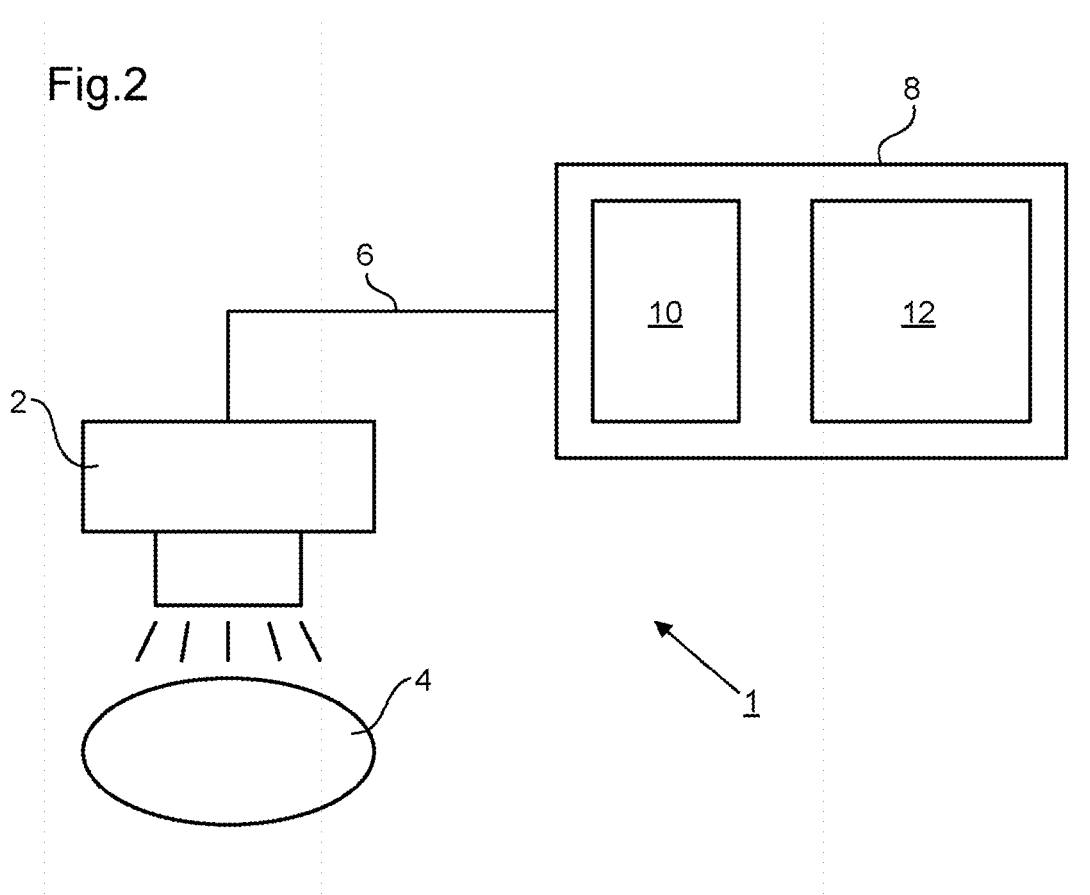
FIG. 2 depicts an imaging apparatus configured to obtain data from a patient using a first imaging modality and use data obtained using a second imaging modality to assign tissue types to the first imaging data voxels.

FIG. 2 illustrates an embodiment in which an imaging apparatus 1 is configured to apply the PDFs to first imaging data obtained from a patient. The imaging apparatus comprises: an imaging device 2 configured to use a first imaging modality to obtain first imaging data at the first spatial resolution from a volume of tissue 4 of a patient. The imaging apparatus 1 comprises a data processing device 8 comprising a storage device 12 and data processing hardware 10. The storage device 12 stores PDFs obtained according any one or more of the methods discussed above. The PDFs therefore represent the probability density of a first parameter value (and, optionally, one or more further first parameter values) for each of a plurality of tissue types defined by a predetermined classification scheme. The data processing device 8 is configured then to compare the value of the first parameter (and, optionally, one or more further first parameter values) in each of the first imaging data voxels of the first imaging data from the patient to the stored PDFs in order to assign each of the first imaging data voxels to one of the tissue type classes. As explained above, this can be achieved for example by using one or more PDFs to obtain one or more probability maps (each of a particular tissue type for example) and using the probability maps to assign the voxels to tissue type classes.

DETAILED EXAMPLE

In the following, it is described how methods and apparatus according to embodiments of the invention can be used to (I) grade tumour areas; and (II) visualize the spatial characteristics of the tumour (e.g. identify tumour boundaries). In the detailed embodiments described MRS and MRI data are applied to brain tumours. However, the methods and apparatus can be applied to other imaging techniques, for example other MR/CT/PET modalities, and/or different pathologies.

Methods
Data

Data from 26 brain tumour glioma patients was acquired in accordance with local ethics procedures. Tumour diagnosis was confirmed histologically except for one diffuse astrocytoma for which there was only a clinical and radiological diagnosis. Tumours were grouped according to their WHO grading:

10 Grade II: 6 diffuse astrocytomas, 3 gemistocytic astrocytomas, 2 grade II oligoastrocytomas.

4 Grade III: 3 anaplastic astrocytomas, 1 anaplastic oligoastrocytoma.

12 Grade IV: 11 glioblastomas, one gliosarcoma.

Metabolic information was acquired using MRS [18]. DTI was acquired for all patient exams and was used to calculate maps of the two derived properties p and q corresponding to isotropic and anisotropic diffusion as described in [22]. Anatomical information was available in the form of standard clinical MRI including T1w, T2w and PD. FLAIR imaging was also available for a subset of patient exams. DTI data were also acquired for 13 controls and p and q maps were computed.

The data acquired from the 26 brain tumour patients and the 13 controls are thus examples of data used to form the reference database.

In an embodiment, the imaging data from different patients is equalized as described above, for example by using the linear transformation described with reference to expression (1).

Combining MRI/DTI and MRS—Pure Tumour

A specific example is now described in which MRI/DTI data is used as first and third imaging data (i.e. data obtained using a first imaging modality and one or more further first imaging modalities) and MRS data is used as second imaging data (i.e. data obtained using a second imaging modality).

PDFs are obtained as described above. The Bayes theorem is then used to calculate the posterior probability $P(\omega_i|X)$ of a voxel X in MRI/DTI space (i.e. a first imaging data voxel) belonging to the ith tissue class $\omega_i$, i=1, ..., L (i.e. the possible tissue types of a predetermined classification scheme) using the a priori probability $P_i$ and the probability density function (PDF) $p(X|\omega_i)$ of class i:

$$P(\omega_i|X) = \frac{P_i p(X|\omega_i)}{\sum_{i=1}^{L} P_i p(X|\omega_i)}. \quad (2)$$

Prior art approaches to performing MRI data segmentation and classification use atlas based a priori probabilities $P_i$ and assume Gaussian PDFs $p(X|\omega_i)$.

According to embodiments disclosed herein, in contrast, MRS is used more accurately (and/or less subjectively) to define PDFs $p(X|\omega_i)$ and a priori probabilities $P_i$ without imposing any assumptions about the data distribution (i.e. about the shape of the PDFs—the way the probability densities of the first and any further first parameter values are distributed).

As described above with reference to FIG. 1, the data from the reference database is analysed according to steps S103-S104 and the resulting PDFs used to assign tissue types to the first imaging data voxels. For the present specific example, the steps followed may be summarised as follows:

1. Select MRS voxels (i.e. second imaging data voxels) that correspond to pure GII, GIII and GIV tumour (i.e. tissue types from the predetermined classification scheme) from the tumour patient dataset (i.e. from a plurality of reference tissue volumes).

2. Extract the corresponding spatial MRI/DTI information (i.e. the first and any further first parameter values of third imaging data voxels) from those pure GII, GIII and GIV tumour MRS voxels and create PDFs (e.g. multi-dimensional PDFs/histograms) for each tumour grade.

3. Extract MRI/DTI information from normal brain tissue to create corresponding PDFs, either using steps (1) and (2) or by application of standard image segmentation methods to conventional MRI.

4. Use the Bayes theorem in equation 2 to calculate the posterior probabilities $P(\omega_i|X)$ for each tissue class at voxel X. The a priori probability $P_i$ is set to $$P_i = \frac{p(X|\omega_i)}{\sum_{i=1}^{L} p(X|\omega_i)}. \quad (3)$$

The posterior probabilities can be calculated in step (4) on a case by case basis and give the probability for each voxel X belonging to tissue class $\omega_i$ in form of probability maps. Optionally, we can perform iterative calculations of the posterior probabilities by using $P(\omega_i|X)$ from the previous iteration as the a priori probabilities Pi for the next iteration or additionally also change the PDFs $p(X|\omega_i)$ with each iteration e.g. by creating new PDFs according to all voxels X with the highest posterior probabilities in the case under investigation. Additional morphological constraints could be applied to the probability maps to take into account the spatial tissue distribution.

The steps (1) to (4) will be explained in further detail in the following paragraphs.

(1) Select Pure Tumour MRS Voxels

MRS provides metabolic information within the brain which differs significantly between normal brain and tumour. FIG. 4 shows typical MR spectra from normal brain (Normal White Matter—bottom right) and mean plus-minus standard deviation of GII brain tumour (top left), GIII brain tumour (top right) and GIV brain tumour (bottom left). In order to select pure tumour MRS voxels, we make use of the fact that the peak seen at 2 ppm (broken vertical line) in bottom right of FIG. 4, corresponding to the metabolite N-acetyl-aspartate (or NAA) is an exclusive marker of normal brain and not present in tumour cells. Reduction of NAA in an MR spectrum is therefore an indicator of abnormal tissue, while absence of NAA would indicate pure abnormal tissue (e.g. tumour, necrosis, cyst, . . . ). According to an embodiment, MRS voxels are selected according to one or more of the following techniques:

1. Metabolite quantification.
2. LCModel tissue type analysis [29].
3. radial Choline-to-NAA-Index (rCNI).

Further details about each of the these techniques is given below in the section headed "Techniques for identifying tissue type using MRS".

In this example the LCModel tissue type analysis is used to select pure tumour voxels in all 26 patient exams [29]. For more accurate selection, pure GII, GIII and GIV tumour voxels are only selected from exams with confirmed GII, GIII and GIV pathology respectively.

(2) Extract Corresponding MRI/DTI Information and Create PDFs

MRS and MRI/DTI data (e.g. second imaging data voxels and third imaging data voxels, respectively) can be aligned using the position information saved by the MR scanner in the corresponding data header files. Once pure tumour MRS spectra are selected in step (1), the corresponding spatial MRI/DTI voxels information can simply be extracted as illustrated in FIG. 5. In this example, each larger square 12 in the left hand diagram of FIG. 5 corresponds to a second imaging data (MRS in this example) voxel. The first imaging data (MRI/DTI) voxels 14 for one example second imaging data voxel 12 are illustrated in the bottom right diagram of FIG. 5. In this example, all pure tumour MRI/DTI information is extracted across the 26 patient exams. The resulting distributions in MRI/DTI space can be considered PDFs and are can be represented in the form of multidimensional histograms.

(3) PDFs—Normal Brain

In order to create PDFs for normal brain, it is necessary to extract MRI/DTI information of normal brain regions (i.e. to identify which of the first imaging data voxels correspond to normal brain regions). At least two possible approaches may be used. First, the same method to extract tumour regions using MRS as explained in steps (1) and (2) may be used. Alternatively or additionally, an automatic healthy tissue segmentation (e.g. the Statistical Parametric Mapping (SPM) atlas based segmentation technique) may be used, based for example on data acquired from healthy volunteers. The segmentation technique has the advantage of providing normal brain MRI intensities separately for white matter (WM), gray matter (GM) and cerebrospinal fluid (CSF). In the present example, the SPM technique is used and is only applied to DTI data.

(4) Posterior Probabilities and Probability Maps

The Bayes theorem in equation 2 is used to calculate the posterior probabilities of a voxel X belonging to either of the tissue classes $\omega_i$=N, WM, GM, CSF, GII, GIII, GIV. The a priori probability $P_i$ is defined as in equation 3 and the PDFs are obtained in steps (1)-(3).

Combining MRI/DTI and MRS—Tumour Infiltration, Tumour Subtypes

The methodology described above is applied to identifying pure tumour regions. However, the methodology can also be applied to other tissue characteristics, e.g. other MRS characteristics. That means, new tissue classes $\omega_i$ and corresponding PDFs can be defined. E.g. by selecting MRS voxels that correspond to a mixture of normal brain and tumour [29], we can create PDFs corresponding to tumour infiltration. To allow a flexible investigation of this possibility, the inventors have developed a tool written in MAT-LAB which allows selection of specific regions in the different PDFs. These regions are then mapped back to the individual patient exams so that their anatomical location may be examined. This software can also be used to investigate the anatomy of data clusters of interest in the PDFs.

Results

PDF/Histogram Equalization

PDFs/histograms of T1w data from different patients were equalized as described above. The average correlation coefficients between the histograms of the different MRI modalities were all greater than 0.97, indicating an accurate alignment.

Combination MRI/DTI and MRS—Pure Tumour (1) Select Pure Tumour MRS Voxels

From the 10 GII, 5 GIII and 12 GIV patients, 39, 64 and 150 MRS voxels (second imaging data voxels) were selected to represent pure GII, GIII and GIV tumour respectively using the LCModel tissue type analysis described below. This information was then used to extract corresponding spatial DTI/MRI information, for example first and further first parameter values for third imaging data voxels corresponding to the second imaging data voxels (see FIG. 5) and create PDFs as described in the methods section above. An example of the proposed methodology is presented here using the DTI derived p, q maps and T2w, PD conventional MRI on the other hand (as examples of different first imaging modalities).

(2)-(3) PDFs

FIG. 7 shows 2D PDFs for the p and q parameters (see example p and q maps in FIG. 3(b)) for the tissue classes $\omega_i$=GII, GIII, GIV. FIG. 8 shows the 2D p,q PDFs for normal brain extracted using the MRS method, while FIG. 9 illustrates the same obtained using the SPM segmentation method using the healthy control data (i.e. derived from reference tissue volumes from healthy volunteers). The SPM segmentation techniques calculates WM, GM and CSF maps from healthy subjects from which we obtain separate PDFs for each healthy tissue type. The normal data obtained from MRS on the other hand contains a mixture of WM and GM but not CSF, so only one normal probability map is obtained in this case. FIG. 6 shows 2D PDFs for the T2w, PD imaging parameters.

(4) Posterior Probabilities and Probability Maps

The posterior probabilities are calculated using the Bayes theorem as described above. Two sets of tissue classes (i.e. two different predetermined classification schemes) were considered. The first set comprises four tissue types and corresponding PDFs: one PDF for normal brain as extracted using MRS plus three PDFs for the three tumour types ($\omega_i^1$=N, GII, GIII and GIV). The second set comprises six tissue types and corresponding PDFs: three PDFs for the normal tissue types WM, GM and CSF, as extracted using the SPM segmentation method, and three PDFs for the three tumour types ($\omega_i^2$=WM, GM, CSF, GII, GIII and GIV).

FIGS. 10-12, 13-15 and 16-18 show the probability maps for a GIV glioblastoma, GIII anaplastic astrocytoma and GII astrocytoma patient respectively. Probability maps are created using the p,q parameters with tissue classes $\omega_i^1$ (FIGS. 10, 13 and 16) and $\omega_i^2$ (FIGS. 11, 14 and 17) and T2w, PD parameters with tissue classes $\omega_i^1$ only (FIGS. 12, 15 and 18). Probability maps contain values between 0 and 1, the latter corresponding to a 100% probability of a voxel belonging to the appropriate tissue class and the former to a 0% probability. RGB images (not shown) can be created for each case to display the GII, GIII and GIV probabilities of each voxel superimposed on the same image. The RGB images show overlapping probabilities in mixed colors. Segmentation images can also be created that assign each voxel to the tissue class with the highest posterior probability. Segmentation images therefore provide a sharp cut off but at the same time allow display of the classification of each voxel across all tissue classes in one image.

For the p,q based probability maps there is visible overlap of GM and tumour tissue. The overlap is reduced when using separate GM and WM distributions in FIGS. 11, 14 and 17. Probability maps calculated from T2w and PD imaging data only (FIGS. 12, 15 and 18) show a tumour region that is of a similar shape and size as that defined by the p and q maps. The separation of normal brain and tumour is clearer than for maps obtained from p and q data, however identification of tumour heterogeneity is not as detailed.

For the GIV case in FIGS. 10 and 11, it is clearly visible that there are two major GIV regions. A rim around the larger region shows GIII characteristics and oedema regions seem to correspond to GII. The two distinct GIV regions show different characteristics. The larger of the two GIV regions appears to contain more fluid components as can be seen by the CSF probability map, suggesting a region of either necrosis or cyst. The smaller GIV region appears to have solid characteristics and possibly corresponds to the viable tumour core. Despite some overlap in distributions between tumour and normal brain (particularly for the GM distribution), the extent of all shown lesion is quite clear. The GIII and GII cases presented in FIGS. 13-18 show a correct classification.

Combination MRI/DTI and MRS—Tumour Infiltration, Tumour Subtypes

From the pure tumour investigation discussed above and the example shown in FIGS. 10-12 it is apparent that there are separate underlying characteristics for tumours that are identified by this new technique. For example the 2D PDFs for GIV tumour shows a cluster with high p and q possibly corresponding to necrosis and/or cyst (see arrow in FIG. 21, left diagram) but also a cluster with very low p and q possibly corresponding to tumour core (see arrow in FIG. 21, right diagram). A similar observation of a p,q cluster could be made for 2D PDFs from MRS voxels containing partly tumour and normal brain (see arrows in FIG. 19). For further investigation, the inventors developed an early stage GUI in MATLAB to manually select regions of interest in 2D p,q PDFs and map them back to individual patient exams to investigate their anatomical location. FIG. 19 shows a screen-shot of the GUI and 2D p,q PDFs for normal brain and voxels containing estimated tumour proportions between 20%-40% for GII, GIII and GIV using a previously published method [29]. The circled region 100 within the GIV distribution clearly highlights a cluster of data-points that is outside of what is expected for normal brain while the ellipse-surrounded region 102 corresponds to normal brain. Because GIV gliomas are known to be highly infiltrative, we can therefore assume that the abnormal region within the region 100 likely corresponds to the estimated tumour proportion. This region 100 is then selected to be a separate distribution additionally to pure tumour and normal brain and mapped back to the example GIV case discussed above with reference to FIGS. 10-12. The resulting additional probability map corresponding to our selected region 100 is shown in FIG. 20. It is believed this distribution identifies infiltrative tumour and seems to correspond to GII regions.

Using the same software tool it is possible to investigate necrotic/cystic and tumour core regions. FIG. 21 shows a manual selection of the necrotic/cyst and tumour core clusters in the p,q map to generate separate PDFs for them. FIG. 22 shows the results of mapping these PDFs into the brain image of the same GIV patient shown in previous figures. Here the two GIV regions previously seen in FIGS. 10 and 11 show different properties. The larger region contains more fluid and seems to correspond to necrosis/cyst (see arrow in FIG. 22, bottom right) while the smaller GIV region corresponds to a solid tumour core component (see arrow in FIG. 22, top right). The ability to locate the solid tumour core component is of great importance for treatment planning.

Segmentation Using Four Imaging Modalities

Additionally to the two example segmentations using the p and q parameters from the DTI, or T2w and PD image intensities from standard MRI, a segmentation using all four imaging modalities was performed. The results of this segmentation are shown in FIG. 25.

Additionally, refinements were made to select the different tissue PDFs. This is shown in FIG. 24. A PDF for vasogenic oedema was created from ROIs drawn within the oedema of 10 patients with brain metastases. A PDF for high grade tumour tissue in general was created by combining GIII+GIV. A necrosis/cyst PDF was manually separated from the GIII+GIV distribution.

Referring to FIG. 24 in detail, in (a-g) refined 2D PDFs in p, q space are shown for different tissue types using a heat map. The tissue PDFs of white matter (WM), gray matter (GM) and cerebrospinal fluid (CSF) in (a-c) were extracted from healthy controls using SPM (Statistical Parametric Mapping). The vasogenic oedema PDF in (d) was extracted from manually drawn ROIs around the oedema region of 10 patients with brain metastases, areas that are not tumour but are oedema associated with a brain tumour. The GII tumour PDF in (e) was selected using MRSI as described before. Similarly the PDF from GIII and GIV was combined to a single PDF to represent high grade tumour tissue (f). A PDF corresponding to necrotic and cystic tissue in (g) was manually separated from the GIII+GIV PDF according to its high p value, which indicates fluid tissue components. The MRSI spectra (thinner grey lines) and their corresponding mean (thick black line) selected to represent the glioma tumour tissue are shown in (h-j).

FIG. 25 depicts segmentation of an example GIV case using four imaging modalities. The top row shows the four MR modalities used for segmentation (p, q, T2w, PD). The bottom two rows show the probability maps for the different tissue types in an equivalent intensity scale from 0 to 1. The segmentation image in the bottom right summarises the probability maps by assigning each voxel to its highest tissue probability. Note an improved separation of normal and abnormal tissue components and reduced overlap compared to the segmentation using DTI or MRI alone.

Techniques for Identifying Tissue Type Using MRS Metabolite Quantification

There are several programs available to automatically quantify individual metabolites within a MR spectrum. Two popular examples are the commercially available LCModel™ [24, 25] and the freely available TARQUIN [26]. As explained above, the near absence of NAA within an MRS voxel indicates purely abnormal tissue. Therefore, the simplest solution to select pure tumour spectra is to select MRS voxels that have no NAA quantified by e.g. using fitting tool such as LCModel™ or TARQUIN but also standard measurements such as peak height or peak integration.

RadialCholine-to-NAA-Index (rCNI)

The Choline-NAA-index (CNI) is elevated in tumour tissue compared to normal brain but the published method [28, 9] of determining CNI assumes rectilinear data distribution about the mean. The inventors have recognised that using a radial co-ordinate system provides superior results. The approach of the inventors may be termed RadialCholine-to-NAA-Index (rCNI).

The prior art CNI approach is discussed below with reference to FIG. 23. The proportions of Choline to NAA are estimated for a plurality of voxels in a multi-voxel MRS Imaging (MRSI) data set. The resulting data points 120 are scattered due to factors such as partial volume effects with CSF, coil sensitivity and volume selection profile but also cell density, but a direction of principal variance (correlation) indicated by regression line 108 can be identified. A recursive regression analysis then calculates the perpendicular distance 114 from each data point to the regression line 108 (the example marked distance 114 is shown with respect to a randomly selected data point 116). Lines 110 represent a mean distance from the regression line 108. Lines 112 represent a distance that is two standard deviations from the mean distance. According to the CNI method, data that is outside twice the standard deviation (95% confidence interval) (i.e. beyond line 112) will be excluded from the next iteration, in which the regression line is recalculated with the remaining data points. The recursive process is repeated until no further data points are found beyond the line 112. The final regression line and confidence interval (e.g. region between lines 112) indicate which data points correspond to normal brain. Data points outside of the lines 112 are identified as being abnormal.

A problem with the CNI approach is that the influence of signal intensity is not adequately taken into account. This is illustrated for two example voxels 104 and 106 in FIG. 23. The line 115 corresponds to a line of constant Choline to NAA ratio ([Cho]/[NAA]=constant) and passes through both of the example voxels 104 and 106. However, voxel 104 lies within the confidence interval delimited by lines 110 whereas voxel 106 lies outside of the confidence interval. Thus, according to the CNI method voxel 104 will be identified as belonging to normal brain tissue while voxel 106 will be identified as belonging to abnormal brain tissue even though both voxels have the same Choline to NAA ratio. This conclusion is not justified, even when considering uncertainties that may arise due to decreased signal to noise for lower intensity metabolite proportions. The only difference in fact between the two voxels is that the signal intensity for voxel 104 happens to be lower than the signal intensity for voxel 106.

The rCNI approach disclosed herein provides an improved scheme for selecting abnormal tissue type voxels which avoids or reduces the problems with CNI discussed above.

In an embodiment, a more generally applicable method is provided for processing imaging (e.g. MRS) data in order to identify abnormal voxels in a volume of interest. The data comprises for each voxel a first value indicative of an amount of a first metabolite in the voxel and a second value indicative of an amount of a second metabolite in the voxel. In the case where the first metabolite is Choline (or NAA) and the second metabolite is NAA (or Choline), the method corresponds to an example of the rCNI approach discussed above.

In an embodiment, the method comprises: obtaining the mean of the arctangent of the ratio of the first and second values over all voxels. Voxels lying within a standard deviation of the arctangent of the ratio of the first and second values multiplied by a predetermined factor from the mean are identified as voxels belonging to a first tissue type (e.g. normal tissue) and voxels lying outside of a standard deviation of the arctangent of the ratio of the first and second values multiplied by a predetermined factor from the mean are identified as voxels belonging to a second tissue type (e.g. tumour tissue). The use of the arctangent avoids numerical problems associated with dividing by very small numbers in the case where the amount of the second metabolite is very small.

In an embodiment, the predetermined factor is greater than 1, for example 1.95.

In an embodiment, the first and second values are scaled such that the mean of the first value is approximately equal to the mean of the second value. This results in an approximately symmetrical distribution of values of the arctangent.

In an embodiment, the obtaining and identifying steps are performed iteratively, with voxels identified as belonging to the second tissue type in one iteration being excluded from the next iteration, until no non-excluded voxels are identified as belonging to the second tissue type. In an embodiment, the first and second values are scaled such that the mean of the first value is approximately equal to the mean of the second value. In an embodiment the scaling is also repeated for each iteration. In other embodiments, the scaling is not repeated.

Thus where the above method is applied to rCNI, the Choline to NAA ratio is used directly as an abnormality measure (via its arctangent) instead of the perpendicular distance from a regression line as in the CNI method.

According to an example of the rCNI approach, the following method is performed, which is illustrated schematically in the flow chart of FIG. 26 and described with reference to FIG. 27. The same method may be performed for other combinations of metabolites by suitable exchange of those metabolites for "Choline" and "NAA" in the discussion below.

1) In step S201: the values representing the amount of choline in each voxel, [Cho], and/or the values representing the amount of NAA in each voxel, [NAA], are scaled over the voxel data set to obtain [Cho-scaled] and [NAA-scaled]. In an embodiment the scaling is such that the mean of Cho values over the data set is equal or approximately equal to the mean of the NAA values over the dataset. This may be achieved by dividing the Cho values by their mean value and the NAA values by their mean value for example. FIG. 27 is a schematic graph of [Cho-scaled] against [NAA-scaled]. The line 118 of [Cho-scaled]=[NAA-scaled] is oriented at 45 degrees for the first iteration (if the scaling is not repeated with each iteration this angle may change slightly for subsequent iterations). This results in an approximately symmetrical distribution of values of arctan([Cho-scaled]/[NAA-scaled]) near the line 118 due to the form of the arctan function in the region of 45 degrees, which helps ensure unbiased selection of voxels to exclude in step S204 (described below).

2) In step S202 the mean and standard deviation of the distribution of values of arctan([Cho-scaled]/[NAA-scaled]) are calculated over the voxel data set. As mentioned above, the use of arctan avoids numerical problems associated with dividing by very small numbers, which in the present embodiment might otherwise arise where NAA proportions are very low, for example in tumours. If the denominator is zero, the arctan)[Cho-scaled]/[NAA-scaled]) is set to pi/2 or 90 degrees.

3) In step S203 a determination is made of whether there are any voxels that lie outside of a predetermined threshold factor, k, multiplied by the standard deviation of the mean. In an embodiment, k=1.95. In FIG. 27, voxels within the zone delimited by lines 120 lie within one standard deviation of the mean. Voxels within the zone delimited by lines 122 lie within k*(standard deviation) of the mean. Thus, in the particular situation illustrated in FIG. 27, voxels 124 for example would be identified as lying outside of k*(standard deviation). If there are one or more voxels thus identified, the process goes to Step S204. If there are no voxels thus identified, the process goes to step S205.

4) In step S204 the identified outlying voxels are excluded and steps S202-S203 are repeated. In an embodiment, steps S201-S203 are repeated (indicated by the broken line path). The process thus continues iteratively until no voxels lie outside of the lines 122 (as recalculated each time according to the reduced set of contributing voxels).

5) In step S205, after the scaling factors for the [Cho] and [NAA] axes and the lines 122 have been refined to provide an improved indication of which voxels correspond to normal tissue (those lying within the refined lines 122 for example) and those that correspond to abnormal tissue (those lying outside the refined lines 122 for example), a classification of the voxels can be output.

Using simulated data the inventors have shown that there is a reduction in the overestimation of abnormal tissue at low metabolite levels with the rCNI method compared to conventional CNI. This should improve the accuracy of tumour delineation by this method as shown for an example case in FIG. 28.

Abnormality z-scores given for each voxel from the CNI or rCNI analysis can be used to create interpolated contour plots to more readily visualize the extent of the estimated abnormalities. Example plots are shown in FIG. 29 for CNI (left) and rCNI (right). The black contours shown on the T1w images correspond to a z-score of 2, 2.5, 3, 5 and 10 from outside to the inside respectively. The rCNI contours match the lesion shape more closely whereas the CNI contours extend far into normal appearing brain.

Any or all of the steps of the above described methods may be performed on a data processing device (e.g. a computer). Software may be provided that comprises instructions for the data processing device to carry out any or all of the steps. The software may be provided on a suitable carrier (e.g. optical disk, flash memory) or the software may be provided by download and/or available from a cloud service or remote server, for example. The data processing device may comprise elements necessary for performing the relevant data processing (e.g. CPU, RAM, memory, hard disk, data medium reader, etc.).

REFERENCES

[1] Louis D, Ohgaki H, Wiestler O, Cavenee W, Burger P, Jouvet A, et al. The 2007 WHO Classification of Tumours of the Central Nervous System. Acta Neuropathologica. 2007; 114:97 109. 10.1007/s00401-007-0243-4.

[2] Tate A R, Underwood J, Acosta D M, Julià-Sapé M, Majós C, Moreno-Torres n, et al. Development of a decision support system for diagnosis and grading of brain tumours using in vivo magnetic resonance single voxel spectra. NMR in Biomedicine. 2006; 19(4):411 434.

[3] Raschke F, Fuster-Garcia E, Opstad K S, Howe F A. Classification of single-voxel 1H spectra of brain tumours using LCModel. NMR in Biomedicine. 2012; 25(2):322 331.

[4] Opstad K S, Ladroue C, Bell B A, Gri-ths J R, Howe F A. Linear discriminant analysis of brain tumour 1H MR spectra: a comparison of classification using whole spectra versus metabolite quantification. NMR in Biomedicine. 2007; 20(8):763 770.

[5] Favre J, Taha J M, Burchiel K J. An Analysis of the Respective Risks of Hematoma Formation in 361 Consecutive Morphological and Functional Stereotactic Procedures. Neurosurgery. 2002; 50(1):48 57.

[6] Hall W A. The safety and efficacy of stereotactic biopsy for intracranial lesions. Cancer. 1998; 82(9):1749 1755.

[7] Jackson R J, Fuller G N, Abi-Said D, Lang F F, Gokaslan Z L, Shi W M, et al. Limitations of stereotactic biopsy in the initial management of gliomas. Neuro-oncology. 2001 July; 3(3):193 200.

[8] Price S J, Jena R, Burnet N G, Hutchinson P J, Dean A F, Pena A, et al. Improved Delineation of Glioma Margins and Regions of Infiltration with the Use of Diffusion Tensor Imaging: An Image-Guided Biopsy Study. AJNR Am J Neuroradiol. 2006; 27(9):1969 1974.

[9] McKnight T R, von dem Bussche M H, Vigneron D B, Lu Y, Berger M S, McDermott M W, et al. Histopathological validation of a three-dimensional magnetic resonance spectroscopy index as a predictor of tumor presence. Journal of Neurosurgery. 2002 October; 97(4):794 802.
[10] Pirzkall A, Li X, Oh J, Chang S, Berger M S, Larson D A, et al. 3D MRSI for resected high-grade gliomas before RT: tumor extent according to metabolic activity in relation to MRI. International Journal of Radiation Oncology*Biology*Physics. 2004; 59(1):126 137.
[11] Lee S W, Fraass B A, Marsh L H, Herbort K, Gebarski S S, Martel M K, et al. Patterns of failure following high-dose 3-D conformal radiotherapy for high-grade astrocytomas: a quantitative dosimetric study. International Journal of Radiation Oncology*Biology*Physics. 1999; 43(1):79 88.
[12] Oppitz U, Maessen D, Zunterer H, Richter S, Flentje M. 3D-recurrence-patterns of gliobastomas after C T-planned postoperative irradiation. Radiotherapy and Oncology. 1999; 53(1):53 57.
[13] Price S, Jena R, Burnet N, Carpenter T, Pickard J, Gillard J. Predicting patterns of glioma recurrence using diffusion tensor imaging. European Radiology. 2007 July; 17(7):1675 1684.
[14] Prastawa M, Bullitt E, Ho S, Gerig G. A brain tumor segmentation framework based on outlier detection. Medical Image Analysis. 2004; 8(3):275 283. Medical Image Computing and Computer-Assisted Intervention—MICCAI 2003.
[15] Luts J, Laudadio T, Idema A J, Simonetti A W, Heerschap A, Vandermeulen D, et al. Nosologic imaging of the brain: segmentation and classification using MRI and MRSI. NMR in Biomedicine. 2009; 22(4):374 390.
[16] De Edelenyi F S, Rubin C, Esteve F, Grand S, Decorps M, Lefournier V, et al. A new approach for analyzing proton magnetic resonance spectroscopic images of brain tumors: nosologic images. Nat Med. 2000 November; 6(11):1287 1289.
[17] Postma G J, Luts J, Idema A J, Julia-Sape M, Ãngel Moreno-Torres, Gajewicz W, et al. On the relevance of automatically selected single-voxel MRS and multimodal MRI and MRSI features for brain tumour differentiation. Computers in Biology and Medicine. 2011; 41(2):87 97.
[18] Wright A J, Fellows G, Byrnes T J, Opstad K S, McIntyre D J O, Griffiths J R, et al. Pattern recognition of MRSI data shows regions of glioma growth that agree with DTI markers of brain tumor infiltration. Magnetic Resonance in Medicine. 2009; 62(6):1646 1651.
[19] Simonetti A W, Melssen W J, de Edelenyi F S, van Asten J J A, Heerschap A, Buydens L M C. Combination of feature-reduced MR spectroscopic and MR imaging data for improved brain tumor classification. NMR in Biomedicine. 2005; 18(1):34 43.
[20] Devos A, Simonetti A W, van der Graaf M, Lukas L, Suykens J A K, Vanhamme L, et al. The use of multivariate MR imaging intensities versus metabolic data from MR spectroscopic imaging for brain tumour classification. Journal of Magnetic Resonance 2005; 173(2):218 228.
[21] Galanaud D, Nicoli F, Chinot O, Confort-Gouny S, Figarella-Branger D, Roche P, et al. Noninvasive diagnostic assessment of brain tumors using combined in vivo MR imaging and spectroscopy. Magn Reson Med. 2006; 55(6):1236 1245.
[22] Peña A, Green H A L, Carpenter T A, Price S J, Pickard J D, Gillard J H Enhanced visualization and quantification of magnetic resonance diffusion tensor imaging using the p:q tensor decomposition. British Journal of Radiology. 2006; 79(938):101 109.
[23] Sibtain N A, Howe F A, Saunders D E. The clinical value of proton magnetic resonance spectroscopy in adult brain tumours. Clinical Radiology. 2007; 62(2):109 119.
[24] Provencher S W. Estimation of metabolite concentrations from localized in vivo proton NMR spectra. Magnetic Resonance in Medicine. 1993; 30(6):672 679.
[25] Provencher S W. Automatic quantitation of localized in vivo 1H spectra with LCModel. NMR in Biomedicine. 2001; 14(4):260 264.
[26] Wilson M, Reynolds G, Kauppinen R A, Arvanitis T N, Peet A C. A constrained least-squares approach to the automated quantification of in vivo 1H magnetic resonance spectroscopy data. Magnetic Resonance in Medicine. 2011; 65(1):1 12.
[27] Raschke F, Davies N P, Wilson M, Peet A C, Howe F A. Classification of single-voxel 1H spectra of childhood cerebellar tumors using lcmodel and whole tissue representations. Magnetic Resonance in Medicine. 2012.
[28] McKnight T R, Noworolski S M, Vigneron D B, Nelson S J. An automated technique for the quantitative assessment of 3D-MRSI data from patients with glioma. J Magn Reson Imaging. 2001; 13(2):167 177.
[29] Raschke and Howe. Analysis of 1H MRSI data of brain tumours using LCModel and whole tissue representations. Proc. Intl. Soc. Mag. Reson. Med. 20 (2012)

The invention claimed is:

1. A computer-implemented method of obtaining one or more probability density functions, each representing, for a different one tissue type from a plurality of possible tissue types of a predetermined classification scheme, a variation in a probability of obtaining a value of a first parameter associated with a first imaging modality over a range of possible values, the probability density function being for use in processing first imaging data obtained using the first imaging modality from a volume of tissue of a patient in order to assign each of first imaging voxels of the first imaging data to one of the tissue types of the classification scheme, the method comprising:

accessing a reference database comprising second imaging data obtained from at least one reference tissue volume using a second imaging modality, the second imaging data comprising a value of a second parameter associated with the second imaging modality for each of a plurality of second imaging data voxels, and third imaging data obtained from the same at least one reference tissue volume using the first imaging modality, the third imaging data comprising a value of the first parameter for each of a plurality of third imaging data voxels;

using the second imaging data to identify the tissue type, according to the predetermined classification scheme, of a plurality of the second imaging data voxels in the reference tissue volume;

for each tissue type, identifying which third imaging data voxels correspond to second imaging data voxels of the tissue type in order to identify a set of third imaging data voxels corresponding to each tissue type; and analysing the distribution of values of the first parameter for the set of third imaging data voxels of each tissue type in order to determine the probability density function for the first parameter value for each of the tissue types.

2. The A method of claim 1, wherein:

at least one of the probability density functions is multidimensional, each dimension of the multidimensional probability density function representing, for one of the tissue types, a variation in a probability of obtaining a value of a different one of a plurality of different first parameters over a range of possible values, each different first parameter being associated with a different one of a plurality of first imaging modalities;

the reference database comprises a plurality of sets of third imaging data, one for each of the plurality of first imaging modalities; and in the analysing step, the distribution of values of each of the plurality of first parameters is analysed in order to determine the multidimensional probability density function.

3. The method of claim 2, wherein the plurality of first modalities comprises diffusion tensor imaging-p, diffusion tensor imaging-q, T2-weighted MRI, and proton density imaging.

4. The method of claim 1, wherein the spatial resolution of the second imaging modality is the same as the spatial resolution of the first imaging modality or, where there are a plurality of first imaging modalities, as the spatial resolution of at least one of the first imaging modalities.

5. The method of claim 1, wherein the spatial resolution of the second imaging modality is different from the spatial resolution of the first imaging modality or, where there are a plurality of first imaging modalities, from the spatial resolution of at least one of the first imaging modalities.

6. The method of claim 5, wherein the spatial resolution of the second imaging modality is lower than the spatial resolution of the first imaging modality or, where there are a plurality of first imaging modalities, than the spatial resolution of at least one of the first imaging modalities.

7. The method of claim 1, wherein the first imaging modality, or where there are a plurality of first imaging modalities at least one of the first imaging modalities, can obtain information from a higher proportion of the volume of tissue of the patient than the second imaging modality.

8. The method of claim 1, wherein the volume of tissue of the patient comprises a portion of the brain or prostate.

9. The method of claim 1, wherein the second imaging modality, the first imaging modality or, where there are a plurality of first imaging modalities one or more of the first imaging modalities, each comprises a different modality that is based on one of the following: Magnetic Resonance (MR), Computerized Tomography (CT), Positron Emission Tomography (PET).

10. The method of claim 1, wherein the first imaging modality, or where there are a plurality of first imaging modalities, each of one or more of the first imaging modalities, is a Magnetic Resonance Imaging (MRI) or Diffusion Tensor Imaging (DTI) modality.

11. The method of claim 1, wherein the second imaging modality is a Magnetic Resonance Spectroscopy (MRS) modality.

12. The method of claim 1, wherein the second imaging modality comprises perfusion imaging.

13. The method of claim 1, wherein:
the predetermined classification scheme comprises one or more tissue types corresponding to normal tissue types and one or more tissue types corresponding to tumour tissue.

14. The method of claim 13, wherein the one or more normal tissue types comprise one or more of the following: normal brain tissue, normal white matter, normal gray matter, normal cerebrospinal fluid.

15. The method of claim 13, wherein the one or more tissue types corresponding to tumour tissue comprise one or more of the following: GII tumour type, GIII tumour type, GIV tumour type.

16. The method of claim 1, wherein the predetermined classification scheme comprises one or more tissue types that consist of tissue that comprises predetermined proportions or one or more normal tissue types and one or more tumour tissue types.

17. The method of claim 1, wherein:
the data in the reference database is obtained from a plurality of reference tissue volumes from different subjects; and each set of third modality data obtained from a given one of the different subjects is subjected to a linear transformation that maximizes a correlation between a probably density function derived from the set of third modality data from that subject and a probably density function of the same type derived from a set of third modality data from a reference subject.

18. The method of claim 1, wherein the second imaging data is used in combination with other reference data to determine the tissue type.

19. The method of claim 18, wherein the other reference data includes information from biopsy and histopathological analysis.

20. A method of processing first imaging data obtained from a volume of tissue of a patient using one or more probability density functions obtained according to the method of claim 1, comprising:
comparing the value of the first parameter, or the values of the first parameters where there are a plurality of first imaging modalities, in each of the first modality voxels of the first imaging data from the patient to the probability density functions and assigning each of the first modality voxels to a tissue type class on the basis of the comparison.

21. The method of claim 20, wherein the comparison step comprises:
using the probability density functions to determine a probability map for each of a plurality of the tissue types, each probability map representing a spatial distribution of probabilities for the occurrence of the tissue type over the volume of tissue; and using the one or more of the probability maps to assign each of the first modality voxels to a tissue type class.

22. The method of claim 20, wherein:
in the comparing step, the value of the first parameter in each of the first imaging data voxels, and if a plurality of first imaging modalities are used the value of each further first parameter, is/are used to index a probability value in the probability density function for each of the tissue types and the tissue type having the highest probability value thus obtained is assigned as the tissue type of the voxel.

23. The method of claim 20, wherein each voxel is assigned to a tissue type that has the highest posterior probability, $P(\omega_i|X)$ $P(\omega_i|X)$ being given by:

$$P(\omega_i \mid X) = \frac{P_i p(X \mid \omega_i)}{\sum_{i=1}^{L} P_i p(X \mid \omega_i)},$$

wherein $\omega_i$, $i=1, \ldots, L$ identifies the ith tissue type among L possible tissue types in the classification scheme, X represents the voxel values and may be a vector where there is more than one first imaging modality, $p(X|\omega_i)$ represents the probability density function for tissue type $\omega_i$, $P_i$ represents the a priori probability.

24. The method of claim 23, wherein the a priori probability is given by:

$$P_i = \frac{p(X|\omega_i)}{\sum_{i=1}^{L} p(X|\omega_i)}.$$

25. The method of claim 23, wherein $P(\omega_i|X)$ is determined iteratively by using the posterior probabilities from a first iteration to calculate the a priori probabilities for the next iteration.

26. The method of claim 23, wherein $P(\omega_i|X)$ is determined iteratively by using the posterior probabilities from a first iteration to refine the probability density functions $p(X|\omega_i)$ of the next iteration.

27. The method of claim 20, further comprising carrying out a method of claim 1 in order to obtain the probability density functions.

28. A computer program comprising instructions for a computer to carry out the method of claim 1.

29. A data processing device configured to perform the method of claim 1.

30. An imaging apparatus, comprising:
an imaging device configured to use a first imaging modality to obtain first imaging data from a volume of tissue of a patient, the first imaging data comprising a value of a first parameter associated with the first imaging modality for each of a plurality of first imaging data voxels;
a storage device storing one or more probability density functions, each representing, for one tissue type from a plurality of possible tissue types of a predetermined classification scheme, a variation in a probability of obtaining a value of the first parameter over a range of possible values; and
a data processing device configured to compare the value of the first parameter in each of the first imaging data voxels of the first imaging data from the patient to the stored probability density functions in order to assign each of the first imaging data voxels to one of the tissue type classes, wherein:
the probability density functions are of a type obtained according to the method of claim 1.

31. The imaging apparatus of claim 30 configured to obtain the probability density functions by carrying out the method of claim 1.

32. A computer-implemented method of processing data in order to identify the tissue type of voxels in a volume of tissue, wherein:
the data comprises for each voxel a first value indicative of an amount of a first metabolite in the voxel and a second value indicative of an amount of a second metabolite in the voxel, the method comprising:
obtaining the mean of the arctangent of the ratio of the first and second values over all voxels;
identifying voxels lying within a standard deviation of the arctangent of the ratio of the first and second values multiplied by a predetermined factor from the mean as voxels belonging to a first tissue type and voxels lying outside of a standard deviation of the arctangent of the ratio of the first and second values multiplied by a predetermined factor from the mean as voxels belonging to a second tissue type.

33. The method of claim 32, wherein the imaging data is MRS data.

34. The method of claim 32, wherein the first and second values are scaled such that the mean of the first value is approximately equal to the mean of the second value.

35. The method of claim 32, wherein the predetermined factor is greater than 1.

36. The method of claim 32, wherein the obtaining and identifying steps are performed iteratively, with voxels identified as belonging to the second tissue type in one iteration being excluded from the next iteration, until no non-excluded voxels are identified as belonging to the second tissue type.

37. The method of claim 36 in which the first and second values are scaled such that the mean of the first value is approximately equal to the mean of the second value and wherein the scaling is also repeated for each iteration.

38. The method of claim 32, wherein the first tissue type is normal tissue and the second tissue type is tumour tissue.

39. The method of claim 32, wherein the first metabolite is Choline and the second metabolite is NAA or vice versa.

* * * * *